US012594772B2

(12) United States Patent
Liberato et al.

(10) Patent No.: US 12,594,772 B2
(45) Date of Patent: Apr. 7, 2026

(54) MEDIA PROCESSING DEVICE AND COMPONENTS FOR ACTIVATABLE MEDIA PLATFORMS

(71) Applicant: Temptime Corporation, Morris Plains, NJ (US)

(72) Inventors: Eric W. Liberato, Pequannock, NJ (US); Anthony J. Cecchin, Kildeer, IL (US); Mohannad Abdo, Clifton, NJ (US); Gene A. Hofer, Lake Zurich, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 226 days.

(21) Appl. No.: 18/369,520

(22) Filed: Sep. 18, 2023

(65) Prior Publication Data

US 2025/0091360 A1 Mar. 20, 2025

(51) Int. Cl.
*B41J 2/325* (2006.01)

(52) U.S. Cl.
CPC .................................... *B41J 2/325* (2013.01)

(58) Field of Classification Search
CPC .... B41J 2/325; B41J 2/32; B41J 2/315; B41F 16/00; B41F 16/0006; B41F 16/0026; B41F 16/0033
See application file for complete search history.

(56) References Cited

U.S. PATENT DOCUMENTS

| | | | |
|---|---|---|---|
| 9,626,612 | B2 | 4/2017 | Forster et al. |
| 2003/0133003 | A1 | 7/2003 | Nedblake, Jr. et al. |
| 2007/0231107 | A1 | 10/2007 | Nolte |
| 2022/0169039 | A1 | 6/2022 | Buthrath et al. |

OTHER PUBLICATIONS

Search Report and Written Opinion dated Dec. 18, 2024 issued for International PCT Application No. PCT/US24/47093.

*Primary Examiner* — Kristal Feggins
(74) *Attorney, Agent, or Firm* — K&L Gates LLP

(57) ABSTRACT

Disclosed is a media processing device. The media processing device including a printing assembly configured to process a media element as the media element passes through the printing assembly. The media element includes an environmental sensor where in activated configuration the environmental sensor is configured to change from an initial sensor state to a second sensor state in response to exposure to a predetermined environmental condition and in a non-activated configuration the environmental sensor is configured to remain in the initial sensor state in response to exposure to the predetermined environmental condition. The media element further includes an activation mechanism configured to apply a force equal to or greater than a predetermined threshold to at least a portion of the environmental sensor to transition the environmental sensor from the non-activated configuration to the activated configuration.

29 Claims, 18 Drawing Sheets

MEDIA PROCESSING DEVICE AND COMPONENTS FOR ACTIVATABLE MEDIA PLATFORMS

BACKGROUND

The present disclosure relates to media processing devices, such as, for example, printers that are used to print or otherwise process media, such as labels, tags, wristbands, inlays, plastic cards, etc. Once the printers print on the media, the media can be placed on objects, such as packages, products for sale at retail, stock shelf labels, etc. The media may be provided on various types, such as a roll or stack, and the media may come in different sizes (e.g., different shapes, lengths and/or widths) which may be printed by the same printer.

BRIEF DESCRIPTION OF THE SEVERAL VIEWS OF THE DRAWINGS

The novel features of the various aspects are set forth with particularity in the appended claims. Throughout the FIGS. like reference characters designate like or corresponding parts throughout the several views of the drawings. The described aspects, however, both as to organization and methods of operation, may be best understood by reference to the following description, taken in conjunction with the accompanying drawings in which:

Figure 1:
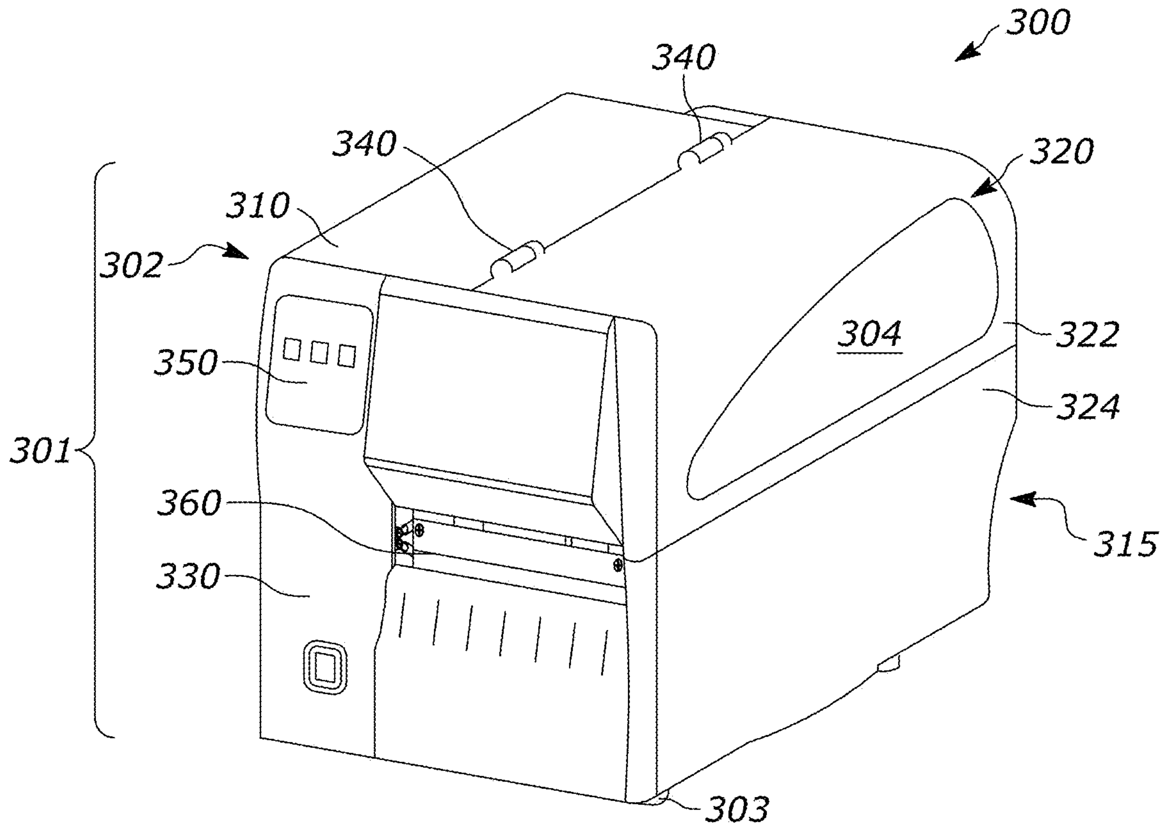
FIG. 1 illustrates a media processing device, according to at least one aspect of the present disclosure.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

Environmental sensing using chemical based indicators (e.g., formed with environmental indicator materials) is partly limited, or produced with higher costs, due to, for example, manufacturing and/or handling (e.g., including storage and shipping) requirements. As a non-limiting example, exposure of the environmental indicator materials that form the chemical based indicator and/or the environmental sensors that use the chemical based indicators to environmental condition(s) that satisfy a response condition (e.g., a predetermined environmental condition) during manufacturing and/or handling can cause the environmental indicator material and/or the environmental sensors including the environmental indicator material to prematurely react based on the environment condition(s) causing the environment indicator material and/or the environmental sensor including the environmental indicator material to be ruined or degraded. As a result, the environment indicator materials and/or environmental sensors including the environmental indicator materials often have to be manufactured and handled in environments that do not cause the environment indicator materials and/or environmental sensors to prematurely react (e.g., prior to its end use application) or in environments that mitigate a reaction of the environment indicator materials and/or the environmental sensors including the environmental indicator materials.

One example of a response condition can be a response temperature (which may be a temperature that is below an ambient temperature). If the temperature of the environment exceeds the response temperature, the response condition can be satisfied causing the environment indicator material and/or the environmental sensor including the environmental indicator material to react to the environment. In this example, manufacturing and handling environments for environmental indicator materials and/or environmental sensors including the environmental indicator materials are typically maintained at temperatures below the response temperature. Similarly an environmental sensor that uses a chemical based indicator configured as a humidity detector needs to be kept dry, and an environmental sensor that uses a chemical based indicator configured as a UV or light exposure indicator needs to be kept out of the sun, prior to deployment with a host product.

One solution to simplifying the use of such environmental sensors that use chemical based indicators, and particularly the management of the supply chain of such environmental sensors prior to pairing, deploying, or otherwise associating the environmental sensors with products, is to introduce mechanisms to selectively activate the environmental indicator materials of the environmental sensors at the end point of application (e.g., when the environmental sensor is deployed with an associated product or products). Some prior activatable indicators rely on keeping materials separate mechanically and then joining them together, e.g., by removing a barrier sheet or bringing two halves of a clamshell structure into close contact. Prior to activation, the indicator does not react with relevant environmental stimulus. Another approach to this is to encapsulate the environmental indicator materials (e.g., in microcapsules) to prevent the environmental indicator materials and/or environmental sensors including the environmental indicator materials from reacting to the environment when the response condition is satisfied and to selectively activate the indicator materials and/or the environmental sensor including the environmental indicator material by rupturing the encapsulation to release the indicator materials as described herein and in concurrently filed related applications: U.S. Patent Application, titled "PRINTER ACTIVATABLE ENVIRONMENTAL SENSING THROUGH CHEMICAL ENCAPSULATION", Ser. No. 18/369,498; U.S. Patent Application, titled "MEDIA CONSTRUCTION TO FACILITATE USE OF ACTIVATABLE PLATFORM", Ser. No. 18/369,536; U.S. Patent Application, titled "USE OF ENCAPSULATED POLAR PROTIC CHEMISTRIES FOR RFID TEMPERATURE MONITORING", Ser. No. 18/369,506; and U.S. Patent Application, titled "RIBBON FOR USE IN PRODUCING PRINTER ACTIVATABLE INDICATORS", Ser. No. 18/369,548.

The encapsulated environmental indicator materials can be placed on media to form an environmental sensor on the media. The environmental sensor can then be later activated with physical forces such as pressure, sheer, cutting or friction sufficient to rupture the encapsulation. The forces can be applied with a device, e.g. a media processing device. In at least one aspect, a media processing device can be configured and/or modified with features and/or components that are textured to have, for example, an abrasive or rough nature to increase the capability of the media processing device to rupture the indicator materials' encapsulation and activate the environmental sensor. In some aspects, heat is also applied to the environmental sensor for activation.

Introducing supplies with textured surfaces or materials that increase the frictional force or hardness can help promote rupturing of microcapsules encapsulating the environmental indicator materials and/or increase the environmental sensing capabilities by rupturing more of the microcapsules with the textured surface than without the textured surface. Some example textured components that can be include or installed in the media processing device are as follows: 1) a platen roller with a textured surface formed by an abrasive or rough material and/or knurling, that is harder and/or rougher than a conventional platen roller, 2) a ribbon with a rough surface, or 3) a looped ribbon on the ribbon mechanism that has a material with rough properties capable of being reused to activate encapsulated environmental indicator materials.

The solution of having an activatable environmental sensor that use chemical-based indicators formed with environmental indicator materials may provide various benefits. The environmental sensor has a non-activated configuration where the media with the environmental sensor can be stored in environments that satisfy the response condition without worrying about ruining or degrading an operation or performance of the environmental sensor. For example, if the environmental sensor was designed to respond to a temperature above a response temperature, the media with the environmental sensor can be stored in the non-activated configuration at a temperature above the response temperature without ruining or degrading an operation or performance of the environmental sensor. This avoids the need to maintain a strict cold chain for the environmental sensors, e.g., during manufacturing and handling before and/or up to a time at which the environmental sensors are paired or associated with products. Then later (e.g., at a time when the media containing the environmental sensor is being associated with a particular product), the environmental sensor on the media can be placed in an activated configuration and the media can be applied to a package of the product or otherwise associated with the product, where the environmental sensor would, from the time of activation provide, a detectable response when the response condition is satisfied (e.g., provide a detectable response to the temperature increasing above the response temperature). Additionally, the ability to activate the environmental sensor facilitates the end-user activating the environmental sensor when desired. This process should allow the end-user to easily store media with environmental sensors that use environmental indicator materials in the non-activated configuration and then activate the media when the end-user needs to monitor a predetermined environmental condition relative to the response criteria associated with the environmental sensors (e.g., the temperature being below a response temperature, a humidity below a response humidity, etc.).

In one general aspect, the present disclosure provides a media processing device. The media processing device including a printing assembly configured to process a media element as the media element passes through the printing assembly. The media element includes an environmental sensor where in activated configuration the environmental sensor is configured to change from an initial sensor state to a second sensor state in response to exposure to a predetermined environmental condition and in a non-activated configuration the environmental sensor is configured to remain in the initial sensor state in response to exposure to the predetermined environmental condition. The media element further includes an activation mechanism configured to apply a force equal to or greater than a predetermined threshold to at least a portion of the environmental sensor to transition the environmental sensor from the non-activated configuration to the activated configuration.

In at least one aspect, the environmental sensor includes a plurality of microcapsules containing an environmental indicator material responsive to the predetermined environmental condition, and wherein at least a portion of the plurality of microcapsules are ruptured by the activation mechanism to place the environmental sensor in the activated configuration.

In at least one aspect, the force includes at least one of a pressure force, a shear force, a frictional force, or a cutting force.

In at least one aspect, the activation mechanism includes an abrasive roller. The printing assembly can include the abrasive roller and a print head. In this aspect, the environmental sensor is placed in the activated configuration due to the force placed on the media element while the media element is passed between the print head and the abrasive roller. In at least one aspect, the abrasive roller includes a roller and an abrasive jacket surrounding the roller.

In at least one aspect, the activation mechanism includes an abrasive ribbon. The printing assembly can include a print head, a roller, and the abrasive ribbon, where the abrasive ribbon is configured to pass between the print head and the roller. In this aspect, the environmental sensor is placed in the activated configuration due to the force placed on the media element by the abrasive ribbon, print head, and roller while the media element is passed between the print head and the roller. In at least one aspect, the media element is positioned between the abrasive ribbon and the roller. In at least one alternative aspect, the media element is positioned between the abrasive ribbon and the print head. In at least one aspect, the printing assembly further includes a thermal transfer ribbon. The thermal transfer ribbon can be positioned between the media element and the print head.

In at least one aspect, the activation mechanism is positioned upstream of the printing assembly to place the environmental sensor in the activated configuration prior to processing by the printing assembly. In at least one alternative aspect, the activation mechanism is positioned downstream of the printing assembly to place the environmental sensor in the activated configuration after processing by the printing assembly. In at least one aspect, the activation mechanism forms part of the printing assembly to place the environmental sensor in the activated configuration while the media element is being processed by the printing assembly.

In at least one aspect, the activation mechanism includes a pair of abrasive rollers, and the environmental sensor is placed in the activated configuration due to a force placed on the media element by the pair of abrasive rollers while the media element is passed between the pair of abrasive rollers.

In at least one aspect, the environmental sensor is placed in the activated configuration based on both the force greater than the predetermined threshold being applied to at least the portion of the environmental sensor and a temperature of at least the portion of the environmental sensor being equal to or greater than a predetermined temperature threshold.

In another general aspect, the present disclosure provides a media processing device. The media processing device includes a print head and an abrasive roller positioned opposite the print head. The print head and abrasive roller are configured to receive a media element therebetween. The media element includes an environmental sensor having an activated configuration in which the environmental sensor is configured to change from an initial sensor state to a second sensor state in response to exposure to a predetermined environmental condition and a non-activated configuration in which the environmental sensor is configured to remain in the initial sensor state in response to exposure to the predetermined environmental condition. The environmental sensor is transitioned to the activated configuration from the non-activated configuration by a force equal to or greater than a predetermined threshold being applied on at least a portion of the environmental sensor while the media element is passed between the print head and the abrasive roller.

In at least one aspect, the environmental sensor includes a plurality of microcapsules containing a material responsive to the predetermined environmental condition, where at least a portion of the plurality of microcapsules are ruptured to place the environmental sensor in the activated configuration.

In at least one aspect, the environmental sensor is placed in the activated configuration based on both a temperature of at least the portion of the environmental sensor being equal to or greater than a predetermined temperature threshold and the force being equal to or greater than the predetermined threshold. In this aspect, the print head is configured to supply heat to increase the temperature of at least the portion of the environmental sensor.

In at least one aspect, the abrasive roller includes a roller and an abrasive jacket surrounding the roller.

In yet another general aspect, the present disclosure provides a media processing device. The media processing device includes a print head, a roller positioned opposite the print head, and an abrasive ribbon. The abrasive ribbon is configured to pass between the print head and the roller. In this aspect, the print head and roller are configured to receive a media element therebetween. The media element includes an environmental sensor having an activated configuration in which the environmental sensor is configured to change from an initial sensor state to a second sensor state in response to exposure to a predetermined environmental condition and a non-activated configuration in which the environmental sensor is configured to remain in the initial sensor state in response to exposure to the predetermined environmental condition. In this aspect, the environmental sensor is transitioned to the activated configuration from the non-activated configuration by a force equal to or greater than a predetermined threshold being applied by the abrasive ribbon, print head, and roller on at least a portion of the environmental sensor while the media element is passed between the print head and roller.

In at least one aspect, the media processing device further includes a guide to maintain the abrasive ribbon in position during operation of the media processing device.

In at least one aspect, the media element is positioned between the abrasive ribbon and the roller. In at least one alternative aspect, the media element is positioned between the abrasive ribbon and the print head. In at least one aspect, the media processing device further includes a thermal transfer ribbon, wherein the thermal transfer ribbon is positioned between the media element and the print head.

In at least one aspect, the environmental sensor includes a plurality of microcapsules containing a material responsive to the predetermined environmental condition, where at least a portion of the plurality of microcapsules are ruptured to place the environmental sensor in the activated configuration.

In at least one aspect, the environmental sensor is placed in the activated configuration based on both a temperature of at least the portion of the environmental sensor being equal to or exceeding a predetermined temperature threshold and the force applied to at least the portion of the environmental sensor being equal to or exceeding the predetermined threshold, and wherein the print head is configured to supply heat to increase the temperature of at least the portion of environmental sensor.

In yet another general aspect, the present disclosure provides a media processing device. The media processing device includes a printing assembly including a first print head and a first roller. The printing assembly is configured to receive a media element at a first upstream end of the printing assembly, feed the media element between and thermally print the media element with the first print head and the first roller, and eject the media element from a first downstream end of the printing assembly. The media element includes an environmental sensor having an activated configuration in which the environmental sensor is configured to change from an initial sensor state to a second sensor state in response to exposure to a predetermined environmental condition and a non-activated configuration in which the environmental sensor is configured to remain in the initial sensor state in response to exposure to the predetermined environmental condition. The environmental sensor is configured to remain in the non-activated configuration while passing through the printing assembly. The media processing device further includes an activation assembly includes a second print head and a second roller. The activation assembly is configured to receive the media element at a second upstream end of the activation assembly, feed the media element between the second print head and second roller, and eject the media element from a second downstream end of the activation assembly. The activation assembly is configured to transition the environmental sensor to the activated configuration from the non-activated configuration by applying a force equal to or greater than a predetermined threshold on at least a portion of the environmental sensor while the media element is fed between the second print head and second roller.

In at least one aspect, the environmental sensor includes a plurality of microcapsules containing a material responsive to the predetermined environmental condition, where at least a portion of the plurality of microcapsules are ruptured to place the environmental sensor in the activated configuration.

In at least one aspect, the second roller is an abrasive roller. In at least one aspect, the second roller includes an abrasive jacket surrounding an exterior surface of the second roller.

In at least one aspect, the activation assembly further includes an abrasive ribbon positioned between the second print head and second roller. In this aspect, the force greater than the predetermined threshold is generated by the abrasive ribbon, second print head, and second roller while the media element is passed between the second print head and the second roller. In at least one aspect, the activation assembly further includes a guide to maintain the abrasive ribbon in position during operation of the media processing device.

In at least one aspect, the printing assembly further includes a thermal transfer ribbon, where the thermal transfer ribbon is positioned between the media element and the first print head.

In at least one aspect, the environmental sensor is placed in the activated configuration based on both a temperature of at least the portion of the environmental sensor being equal to or exceeding a predetermined temperature threshold and the force applied to at least the portion of the environmental sensor being equal to or exceeding the predetermined threshold, and wherein the second print head is configured to supply heat to increase the temperature of at least the portion of environmental sensor.

In at least one aspect, the printing assembly is positioned upstream of the activation assembly. In at least one alternative aspect, the printing assembly is positioned downstream of the activation assembly.

In yet another general aspect, a method of activating an activatable media element. The method includes feeding a media element into an upstream end of a printing assembly of a media processing device. The media element includes an environmental sensor having an activated configuration in which the environmental sensor is configured to change from an initial sensor state to a second sensor state in response to exposure to a predetermined environmental condition and a non-activated configuration in which the environmental sensor is configured to remain in the initial sensor state in response to exposure to the predetermined environmental condition. The environmental sensor includes a plurality of microcapsules containing a material responsive to the predetermined environmental condition. The method further includes placing the printing assembly in a print mode and printing the media element using the printing assembly, where the printing assembly is in the print mode. The method further includes placing the printing assembly in an activation mode and placing the environmental sensor in an activated configuration using the printing assembly, where the printing assembly is in the activation mode. In the activation mode the printing assembly supplies a force equal to or greater than a predetermined threshold to place the environmental sensor in the activated configuration by rupturing at least a portion of the plurality of microcapsules. The method further includes ejecting the media element out of a downstream end of the printing assembly.

In at least one aspect, in the activation mode the printing assembly includes an abrasive roller and a print head. In this aspect, placing the environmental sensor in the activated configuration by rupturing at least the portion of the plurality of microcapsules includes feeding the media element between the print head and the abrasive roller.

In at least one aspect, in the activation mode the printing assembly includes a roller, a print head, and an abrasive ribbon. In this aspect, the abrasive ribbon is positioned between the roller and the print head, and placing the environmental sensor in the activated configuration by rupturing at least the portion of the plurality of microcapsules includes feeding the media element between the print head and the roller. In this aspect, the print head, the roller, and the abrasive ribbon apply the force greater than the predetermined threshold to the plurality of microcapsules. In at least one aspect, in print mode the printing assembly includes a thermal transfer ribbon positioned between the roller and a print head, and wherein in the activation mode the thermal transfer ribbon is replaced with the abrasive ribbon.

In at least one aspect, the method further includes retracting the media element back through the printing assembly after printing and feeding the media element forward through the printing assembly to perform activation.

In at least one aspect, there is a delay between printing the media element and placing the environmental sensor in the activated configuration. In at least one aspect, the method further includes storing the media element in the non-activated configuration.

FIGS. 1-7 illustrate a media processing device 300 that can be used to process media elements that include environmental sensors. FIG. 1 illustrates a media processing device 300 according to at least one aspect of the present disclosure. While the illustrated embodiments and description provided herein are directed primarily to a printing device, other media processing devices such as media encoders, magnetic stripe readers, RFID readers, label rewinders, card laminators, label applicators, or other devices may be part of the media processing device. For example, printing, encoding, and/or laminating functionality may be incorporated into a single media processing device.

The media processing device 300 of FIG. 1 includes a housing 301 and a base 303. The housing 301 may include a front panel 330, a rear panel 315, a side panel 302, and a support surface 310. The housing 301 may include a user interface 350 and a media exit 360. The media exit 360 may be arranged in the front panel 330 of the media processing device 300 and may be configured to expel media after it has been processed. The housing 301 may further include an access door assembly 320 including a major door 322 and a minor door 324. The major door 322 may be hingedly attached to the support surface 310 with hinges 340 and the minor door 324 may be hingedly attached to the major door 322. The access door assembly 320 of FIG. 1 is illustrated in the closed, operational position in which access to the internal components of the media processing device is precluded. In addition to keeping dirt, dust, and foreign objects from entering an internal cavity of the media processing device and potentially contaminating the consumables or the electronics of the processing device, the closed door may also reduce noise and prevent users from inadvertently touching sensitive components.

Figure 2:
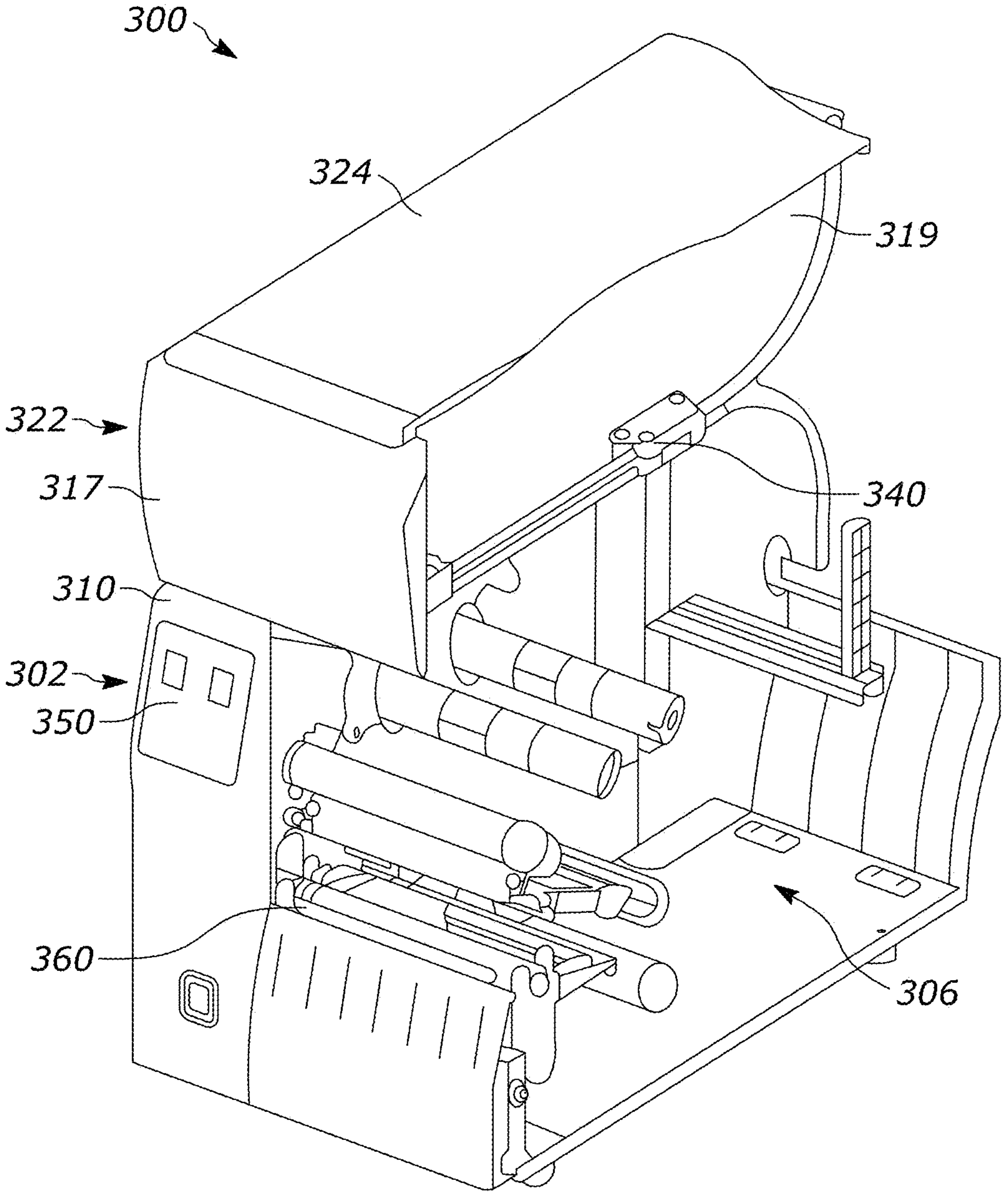
FIG. 2 illustrates the media processing device of FIG. 1 with an access door in an open position, according to at least one aspect of the present disclosure.

Referring to FIG. 2, positioning the hinges 340 proximate a centerline of the housing 301 allows the access door assembly 320 to pivot about hinges 340 and achieve the major support position when the major door 322 comes to rest on the support surface 310. Locating the hinges 340 proximate the centerline of the housing 301 further enables the side panel 302 of the media processing device to be situated against a surface, such as a wall or a cabinet, while still permitting the access door assembly 320 to achieve the major support position. The major door 322 may include at least a portion of the front panel 317 and/or a portion of the rear panel 319 to provide greater access to the internal cavity 306 when the major door is disposed in the major support position as will be described further below. In an alternative aspect, however, the major door 322 may include only a portion of the front panel.

The minor door 324 may be hingedly attached to the major door 322 and pivotable between an operational position (as shown in FIG. 1) and a minor support position (as shown in FIG. 2). In the operational position, the minor door 324 may be substantially co-planar with the access door assembly side 304 of the housing. In this operational position, the media processing device is ready for use and the internal cavity 306 is not accessible due to the position of the access door assembly 320. When the major door 322 is in the major support position, access to all of the necessary components to load and unload consumables (e.g., print media and printer ribbon) within internal cavity 306 is provided.

Figure 3:
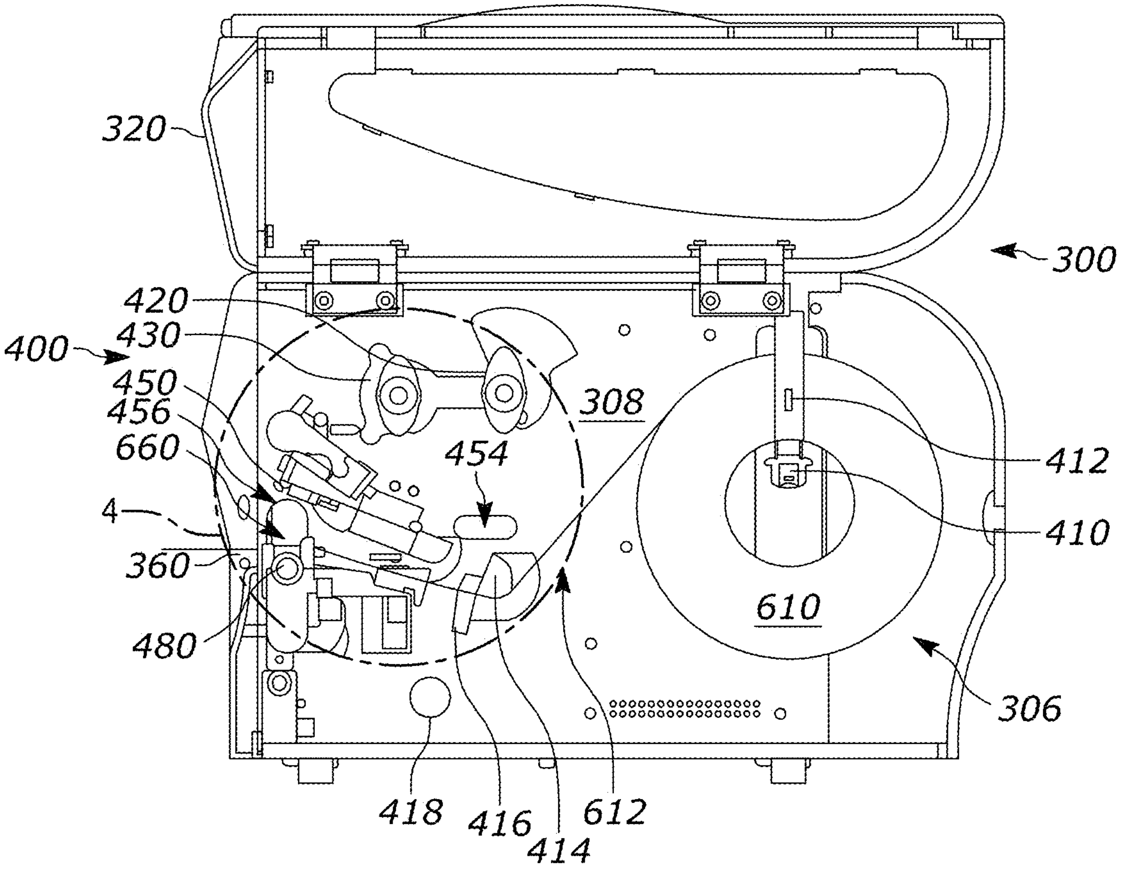
FIG. 3 illustrates a side view of the media processing device of FIG. 1 with a roll of media installed, according to at least one aspect of the present disclosure.
Figure 4:
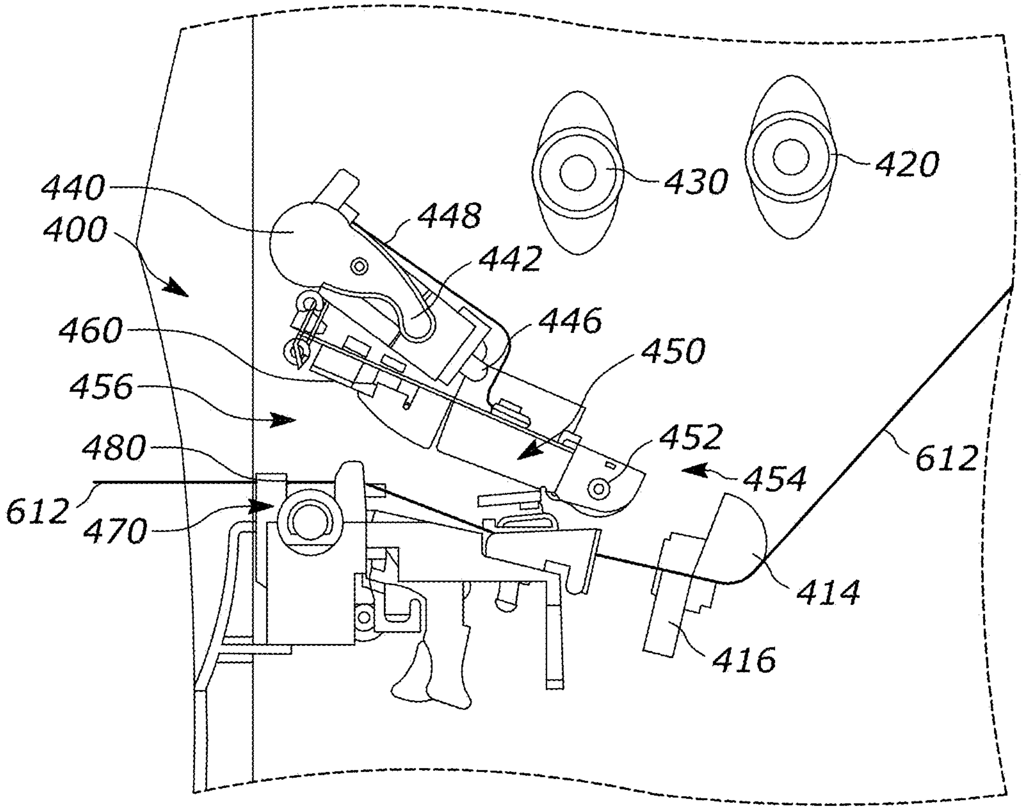
FIG. 4 illustrates a detailed view of a printing mechanism of the media processing device of FIG. 1 wherein the printing mechanism is disposed in a loading position, according to at least one aspect of the present disclosure.

Before a printing operation may begin, the print media must be loaded into the media processing device. FIG. 3 illustrates the media processing device 300 of FIG. 1 with a media supply roll 610 loaded on a media spindle or hanger 410. In at least one aspect, the media processing device 300 includes a media spindle alignment feature 412, a media guide 414, and a media sensor 416. The alignment feature 412 that may fold or rotate to a loading position, whereby a media supply roll 610 may be loaded onto the media spindle 410, and subsequently, the alignment feature 412 may fold or rotate back into engagement with the media supply roll 610 to maintain the media supply roll 610 in the proper position on the media spindle 410. The media supply roll 610 is positioned upstream of the print head assembly 450. For example, the media web 612 may extend from the media supply roll 610, through one or more guiding features, to the printing mechanism 400, i.e. printing assembly, and/or other processing components. In at least one aspect, the media web 612 extends from the media supply roll 610, around the media guide 414 and past the media sensor 416 to arrive at the print head assembly 450. A media element of the media web 612 is loaded into an upstream end 454 of the print head assembly 450.

In at least one aspect, the media processing device 300 can include a media input instead of a media supply roll 610. For example, a media element can enter into the media processing device through the media input and be loaded the upstream end 454 of the print head assembly 450. As another example, a media supply can be located outside of the media processing device and a media web of the media supply can extend through the media input and be loaded the upstream end of the print head assembly 450. In an alternative aspect, the media can be supplied from a media stack instead of a media roll (e.g. a stack of plastic cards or a fanfold web of tag stock).

The media sensor 416 may provide a signal to the printer electronics when the media web is present which may allow the printer to determine when printing may occur. The media sensor may be configured to read or otherwise sense the transition or delineation between individual media elements on the media web 612 to enable alignment of the image printed at the print line of the print head 460 relative to the edges of the media element. The media web 612 may extend along the print head assembly 450, between the nip defined by the print head 460 and the platen roller 480, and out through the media exit 360. As illustrated, when the print head assembly 450 is disengaged from the platen roller 480, a loading gap 660 is created between the print head 460 and the platen roller 480 which allows a user to more easily feed the media web 612 from the media supply roll 610, past the media sensor 416, and through the print mechanism to the media exit 360. Conventionally, if the print head 460 does not disengage from the platen roller 480, the structure of the platen/print head nip can present a conflict in that tight tolerances between the print head 460 and the platen roller 480 assist in printing, but such tolerances may make it difficult for a user to insert the media web 612 between the print head 460 and the platen roller 480 during loading of the media web 612 into the media processing device 300.

FIG. 3 illustrates a side view of the media processing device 300 of FIG. 1 with a media supply roll 610 installed, according to at least one aspect of the present disclosure. The major door 322 of the access door assembly 320 is in the major support position exposing the internal cavity 306 and the printer chassis 308. The printer chassis 308 is a structural member configured to support some or all of the internal components of the media processing device 300. The internal components within the internal cavity 306 may also include a ribbon supply spindle 420 and a ribbon take-up spindle 430. The ribbon supply spindle 420 may be configured to hold a spool of the unused portion of a ribbon while the ribbon take-up spindle 430 may be configured to hold a spool of the used portion of the ribbon. Also illustrated is the media exit 360 through which printed media exits the media processing device 300. The printer chassis 308 holds the media spindle 410, ribbon supply spindle 410, ribbon take-up spindle 430, and the printing mechanisms 400 in place within the internal cavity 306.

In at least one aspect, the printed media on the media web 612 can be collected on a media take-up roller 418. In this aspect, the media web 612 extends around the platen roller 480 and down toward the media take-up roller 418. For example, the media take-up roller 418 can move as the platen moves to collect media printed on the media web 612. Once all the desired media is printed, the media on the media take-up roller 418 can be removed for later use.

The printer chassis 308 may further hold a printing mechanism 400 as shown in detailed circle 4 which is further illustrated in FIGS. 4-7 depicting an enlarged view of the detailed circle 4 of FIG. 3. The printing mechanism 400 may include a print head assembly 450 including a print head 460, a platen assembly 470 including a platen roller 480, and a toggle assembly 440 including a toggle handle 442, biasing member 446, and a lift strap 448. The print head assembly 450 is illustrated in a loading position in FIG. 4 and a printing position in FIG. 5, both according to at least one aspect of the present disclosure. The print head 460 and the platen roller 480, when engaged, define a nip therebetween. In the printing position, the print head 460 engages the platen roller 480 along a print line.

The illustrated printing mechanism 500 may be configured for direct thermal printing by feeding a media element that includes a heat activated thermal coating through the nip and out the downstream end 456 of the print head assembly 450. The print head 460 is configured to supply heat to the media element causing the heat activated thermal coating to show in specific locations on the media element. In at least one aspect, the print head 460 can heat the media element up to 300° C. Generally, the media element is heated to between 100° C.-120° C. during normal direct thermal printing operations.

The illustrated printing mechanism 400 may be configured for thermal transfer printing by feeding a media element and a printer ribbon through the nip and out the downstream end 456 of the print head assembly 450. The print head 460 may heat and compress the ribbon against the media element to deposit ink from the ribbon onto the media element. In at least one aspect, the print head 460 can heat the media element up to 300° C. Generally, the media element is heated to between 100° C.-120° C. during normal thermal transfer printing operations.

Figure 5:
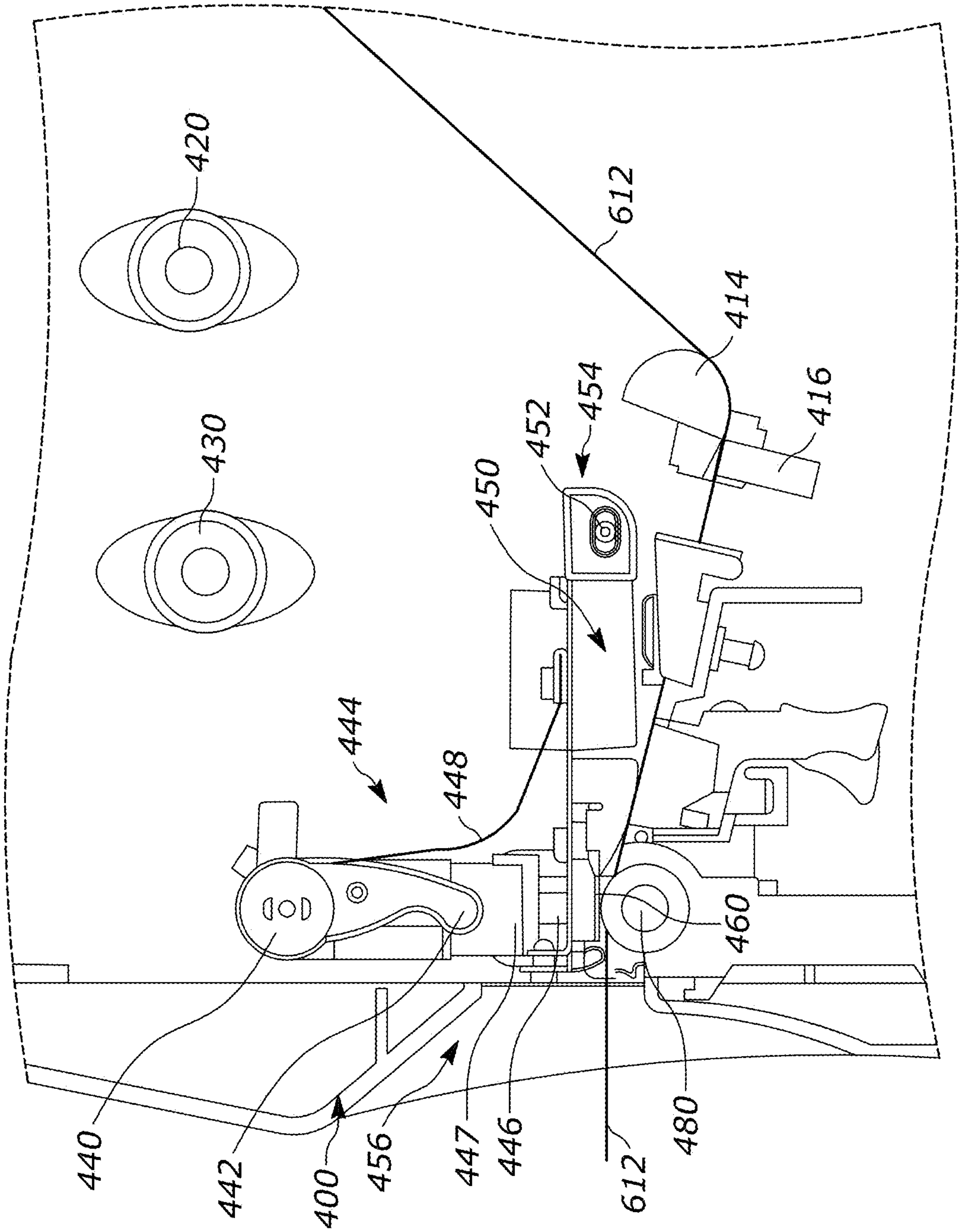
FIG. 5 illustrates a detailed view of the printing mechanism of FIG. 4, wherein the printing mechanism is disposed in a printing position, according to at least one aspect of the present disclosure.

In at least one aspect, the print head assembly 450 of the printing mechanism 400 is pivotably attached along axis 452 to the printer chassis 308. The print head assembly 450 includes the print head 460 which is mounted to the print head assembly 450 with a retention spring mechanism as will be further detailed below. The toggle assembly 440 is pivotally attached to the printer chassis 308 and is configured to be manually rotated by a user via handle 442 between a disengaged position (FIG. 4) and an engaged position (FIG. 5). As the toggle assembly 440 is rotated from the disengaged position to the engaged position along arrow 444, the driving elements 446 drive the print head assembly 450 into the printing position. The driving elements 446 may include a curved profile configured to slidably engage a surface of the print head assembly 450 as the toggle assembly 440 is rotated along arrow 444. The curved profile of the driving elements may provide a cam-type functionality which moves along the print head assembly 450 as the toggle assembly 440 is rotated and drives the print head assembly 450 into the printing position. Thus, the contact areas between the driving elements 446 and the print head assembly 450 may be configured to allow a sliding motion as the toggle assembly is rotated to the engaged position. Detents within the toggle assembly 440 are configured to retain the toggle assembly in either the engaged position or the disengaged position. When the toggle assembly 440 is in the engaged position, the driving elements 446 hold the print head assembly 450 in the printing position with the print head 460 engaged with the platen roller 480. In response to the toggle assembly being moved from the engaged position of FIG. 5 to the disengaged position of FIG. 4, the driving elements 446 are disengaged from the print head assembly 450 and the lift strap 448 is configured to raise the print head assembly 450 out of the printing position and into the loading position.

The driving elements 446 may be adjusted such that the amount of pressure applied to the print head assembly 450 in the engaged position is variable. In at least one aspect, the pressure can range from 2-15 pounds per square inch based on the adjustment. For example, normal printing operations generally require pressure in the range of 2-8 pounds per square inch. The adjustment mechanism may be arranged within adjustment members 447 wherein the adjustment members 447 are configured to be moved between pre-defined positions. The movement may be achieved by rotating an end of the adjustment member 447 which either extends or retracts the driving element 446 dependent upon the direction of rotation. The adjustment members may be configured with indicators of the pre-defined positions to which the adjustment mechanism may be moved. The pre-defined positions may be indicated by figures, numbers, or other indicia that allows a user to easily interpret the effect of the adjustment (e.g., more pressure or less pressure). Further, embodiments which include multiple driving elements 446 may include an adjustment member 447 for each driving element 446. The pre-defined positions with marked indicia may be used to adjust the driving elements 446 to the same, or possibly different positions, resulting in different levels of pressure applied across the print head assembly 450 by the driving elements 446. Adjusting the driving elements 446 to a longer length results in greater pressure applied to the print head assembly 450, thereby increasing the pressure of the print head 460 against the platen roller 480. The adjustable driving elements 446 enable a user to adjust the print head pressure to optimize the print quality. In at least one aspect, the adjustable driving elements 446 may be adjusted manually by a user. In an alternative aspect, the adjustable driving elements 446 may be adjusted by motors coupled to a control circuit. In this aspect, the control circuit adjusts the driving elements based on an input.

The lift strap 448 may be attached at one end to the toggle assembly 440 and at the other end to the print head assembly 450. The lift strap 448 may be made of any flexible, high-tensile strength material with low elasticity, for instance a polyester film. In response to the toggle assembly 440 being moved from the engaged position of FIG. 5 to the disengaged position of FIG. 4, the toggle assembly 440 lifts the lift strap 448 to raise the print head assembly 450 from the printing position to the loading position. Further, the lift strap 448 suspends the print head assembly 450 in the loading position while the toggle assembly 440 is in the disengaged position.

Figure 6:
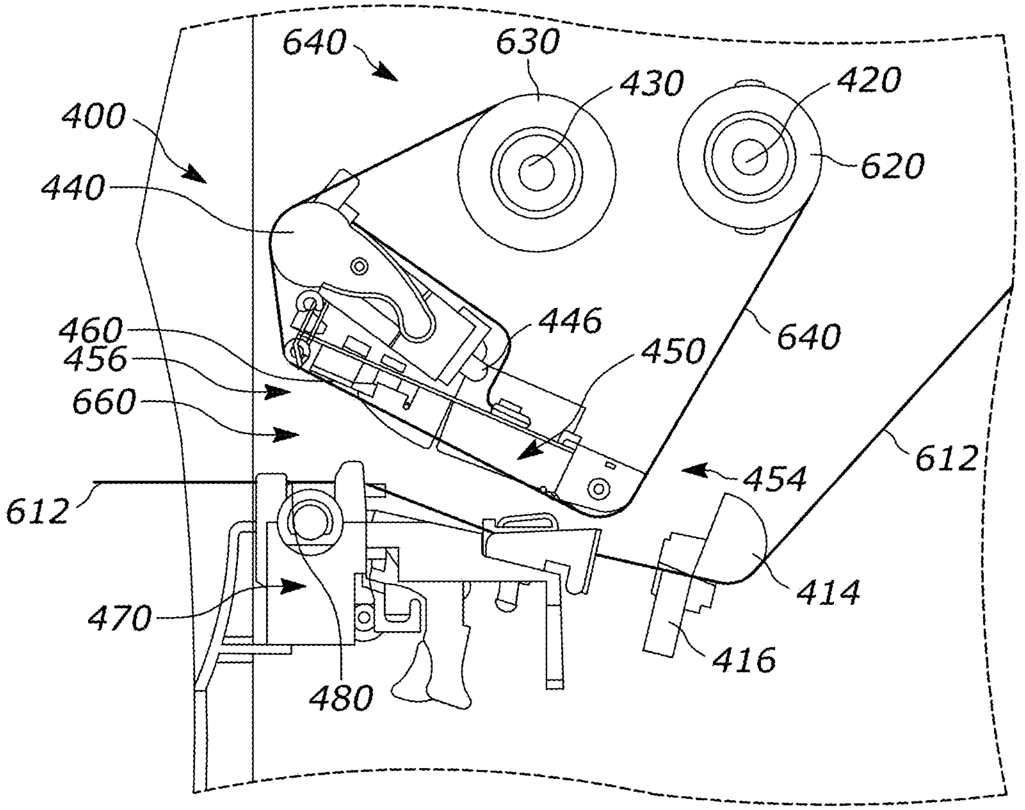
FIG. 6 illustrates a detailed view of the printing mechanism of FIG. 4, wherein the printing mechanism is disposed in the loading position and a ribbon has been installed, according to at least one aspect of the present disclosure.

Thermal transfer printers use an ink ribbon that contains ink disposed on a substrate, where the ink is transferred to a media substrate of a media element via pressure and heat. Media processing devices according to example embodiments of the present invention may use any number of types of ribbons including dye ribbons, hologram ribbons, security material ribbons, and UV coating ribbons, among others. Therefore, in addition to the media substrate being loaded and aligned between the print head assembly 450 and the platen roller 480, the ink ribbon 640 must be similarly inserted between the print head 460 and the platen roller 480. FIG. 6 illustrates the printing mechanism 400 with a printer ribbon installed, according to at least one aspect of the present disclosure. The ink ribbon 640 includes a supply spool 620 and a take-up spool 630, each disposed on a respective spindle. The ink ribbon 640 is fed along an ink ribbon path extending from the supply spool 620, around the print head assembly 450, and past the print head 460. The ink ribbon 640 makes a relatively sharp upward transition after the print head 460 toward the toggle assembly 440, around which the ink ribbon bends to arrive at the take-up spool 630. The relatively sharp transition after the print head 460 provides a peel-mechanism whereby the ink ribbon is lifted from the media substrate at a sharp angle to reduce the flash or excess ink that may surround a printed image.

Figure 7:
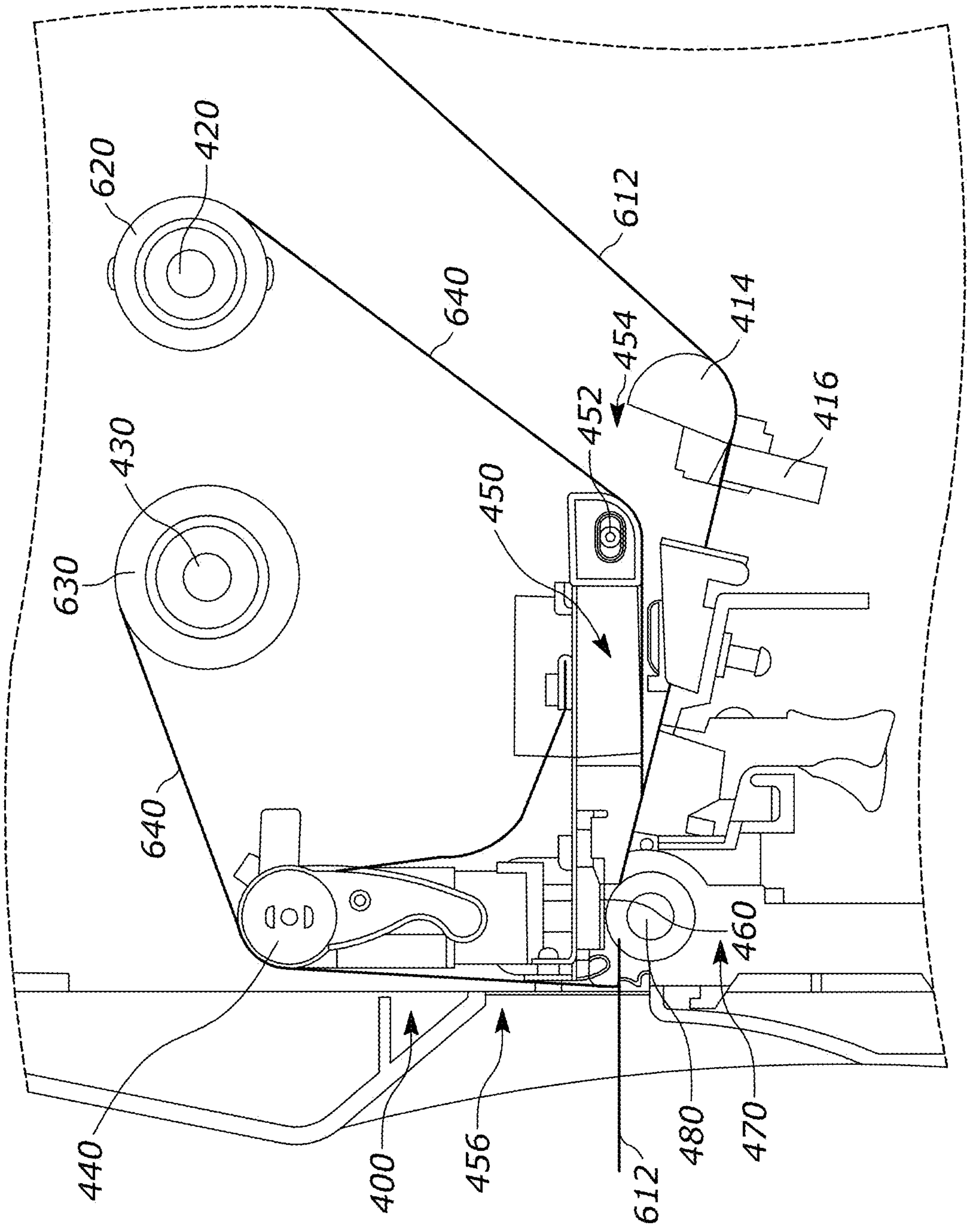
FIG. 7 illustrates a detailed view of the printing mechanism of FIG. 6, wherein the printing mechanism is disposed in the printing position, according to at least one aspect of the present disclosure.

FIG. 6 illustrates the ink ribbon 640 installed onto the print mechanism and properly routed past the print head 460. As illustrated, the loading gap 660 created when the print head assembly 450 is disengaged from the platen roller 480 allows the ink ribbon 640 to be easily routed and aligned to the print head assembly 450. FIG. 7 illustrates the ink ribbon 640 as installed with the print head assembly 450 in the engaged position, according to at least one aspect of the present disclosure. As depicted, the path from the supply spool 620 to the take-up spool 630 is longer when the print head assembly 450 is in the printing position such that when the toggle assembly 440 is moved from the loading position to the printing position, tension is applied to the ink ribbon 640. The tension applied to the ink ribbon 640 is desirable and ensures that the ink ribbon 640 lays flat against the print head 460. Further, the tension applied to the ink ribbon 640 provides more consistent and repeatable alignment of the ribbon.

To perform a thermal transfer printing process, a media element of the media web 612 and an ink ribbon 640 are fed through the nip and out the downstream end 456 of the print head assembly 450. During the thermal transfer printing process, the print head 460 and platen roller 480 compress the ink ribbon 640 against the media element and the print head 460 provides heat to desired sections to deposit ink from the ink ribbon 640 at those desired sections onto the media element.

Figure 8:
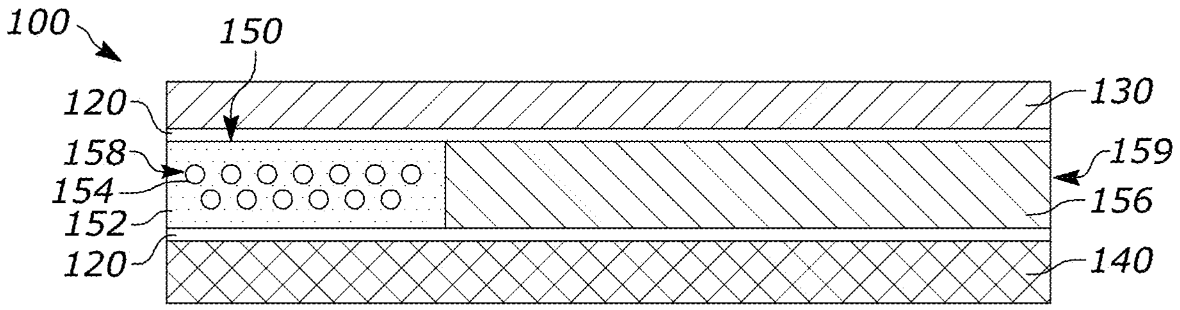
FIG. 8 illustrates a diagram of a cross-section of an example media element including an environmental sensor, according to at least one aspect of the present disclosure.

Microcapsules 154 encapsulating an indicator material 158 can be placed on or in a media element 100. Media element 100 is one non-limiting example of a media element. Some examples of media elements 100 that can include the encapsulated indicator material 158 can include, for example, labels, tags, wristbands, inlays, plastic cards, etc. For example, the microcapsules 154 can be placed on the surface of a media element 100. As another example, the microcapsules 154 can be placed in a layer within the media element 100. FIG. 8 illustrates a diagram of a cross-section of one example media element 100 including an environmental sensor 150, according to at least one aspect of the present disclosure. The media element 100 includes a printable substrate made of layers attached to each other with adhesive layers 120 (e.g., a face sheet layer composed of face sheet 130 material, an environmental sensor layer 159, and a release layer composed by a release liner 140). In at least one aspect, one of the layers is a paper material. One of the layers is the environmental sensor layer 159 that includes microcapsules 154 encapsulating an indicator material 158 to form an environmental sensor 150 on the media element 100.

In some aspects, the environmental sensor layer 159 further includes a carrier material 152 surrounding the microcapsules 154. The carrier material 152 can be required for some methods of placing the microcapsules 154 onto the environmental sensor layer 159 of the media element 100. In an alternative aspect, the environmental sensor 150 is placed on the environmental sensor layer 159 without the carrier material 152. In some aspects, the media element 100 can include the face sheet 130 and can be devoid of the adhesive 120 and release liner 140.

Additionally, the environmental sensor layer 159 further includes a fill material 156. In some aspects, the fill material 156 can be part of the environmental sensor 150 (e.g. a wicking material to move the indicator material 158 along the substrate). In an additional/alternative aspect, the fill material 156 is mainly used to bridge the gap between layers formed by the microcapsules 154 (e.g. the fill material can be face sheet 130 material) so that a thickness of the media element 100 is uniform.

In some aspects, the release liner 140 is selectively detachable from the media element 100 to expose one of the adhesive layers 120, which can include an adhesive that can be used to affix the media element 100 to an object. In an alternative aspect, the media element 100 is liner-less and does not include the release liner 140. In at least one aspect, the media element 100 includes a layer that is a face sheet 130 covering the layer with the microcapsules 154. In some aspects, when the observable effect corresponds to a visual effect, the face sheet 130 can have more or one windows or openings through which a portion of the environmental sensor 150 and/or the environmental sensor layer 159 can be viewed. In at least one aspect, the face sheet 130 material is a paper material, polyester material, thermoplastic and/or vinyl polymer materials, such as polypropylene, polyethylene, polyethylene terephthalate, nylon, and/or Tyvek®, and/or any combination thereof. The media element 100 can be printed on through a thermal transfer printing process.

In some aspects, the media element 100 includes a layer with a heat activated thermal coating (e.g., the face sheet 130 can include the heat activated thermal coating), which allows the media element 100 to be printed on using a direct thermal printing process. For example, the media element 100 can be printed on through a thermal transfer printing process using an ink ribbon and/or can be printed on through a direct thermal printing process in which the media element 100 includes a heat activated thermal coating (e.g., in the face sheet 130 or another layer of the media element 100).

In some aspect, the media element 100 can include the face sheet and the sensor layer 159 and can be devoid of the adhesive layer 120 between the release liner 140 and the sensor layer and/or can be devoid of the release. In such instances, a second face sheet 130 can be included in the media element 100 such that the sensor layer 159 is disposed between the first and second face sheets 130. Some examples of media elements 100 that can include the encapsulated indicator material 158 are labels, tags, wristbands, inlays, plastic cards, and etc.

The microcapsules 154 encapsulate one or more environmental indicator materials 158. After the environmental sensor 150 is activated and the environmental indicator material 158 is exposed to a predetermined environmental condition, then the environmental sensor 150 changes from an initial sensor state to a second sensor state producing an observable effect. In at least one aspect, the change in material state from an initial material state to a second material state is a change in a property of the material (e.g. a state of matter, electrical conductivity, color attributes, and etc).

In at least one aspect, the microcapsules 154 prevent the observable effect from occurring in the environmental sensor 150 by protecting the environmental indicator material 158 from exposure to the predetermined environmental condition. For example, the encapsulated environmental indicator material 158 can stay in the initial material state even if the microcapsules 154 are exposed to the predetermined environmental condition. However, after the microcapsules 154 are ruptured, the environmental indicator material 158 is released and any change in the material state of the environmental indicator material 158 upon exposure to the predetermined environmental condition can cause the observable effect to be produced by the environmental sensor 150. In an additional or alternative aspect, the microcapsules 154 prevent the observable effect from occurring in response to the predetermined environmental condition by containing the environmental indicator material 158 when it changes material state. For example, the environmental indicator material 158 can change material states within the microcapsule 154 but the observable effect can be prevented until the microcapsules 154 are ruptured releasing the environmental indicator material 158 and the released environmental indicator material 158 is exposed to the predetermined environmental condition (e.g., by preventing movement of the material when it liquefies, or by hiding a color change of the material).

Figure 9:
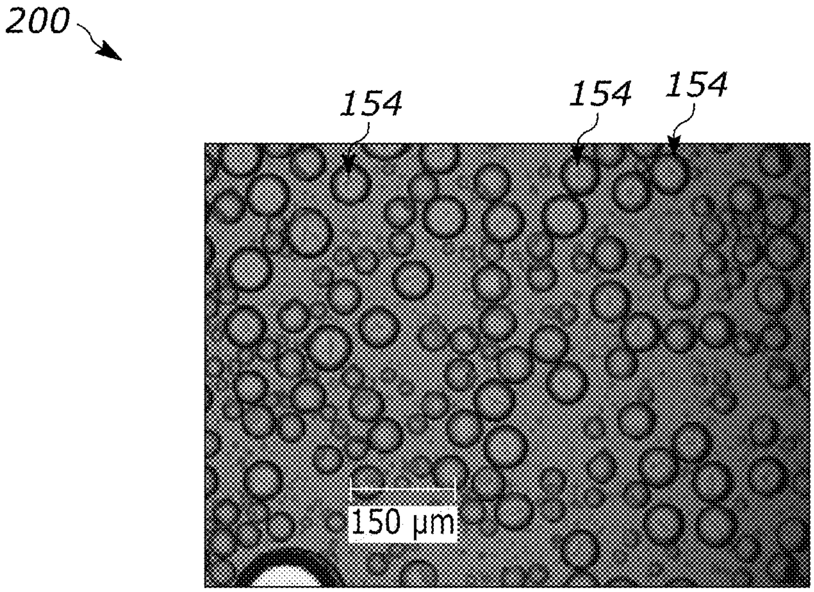
FIG. 9 illustrates an example view of a plurality of microcapsules of an environmental sensor on a media element, according to at least one aspect of the present disclosure.

In at least one aspect, a diameter of each microcapsule 154 is between 20 μm to 250 μm. The shell thickness of each microcapsule 154 can range between 5 μm to 25 μm. FIG. 9 illustrates an example view 200 of microcapsules 154 of the environmental sensor 150 on the media element 100, according to at least one aspect of the present disclosure. The microcapsules 154 can be made of a variety of materials, e.g. urea formaldehyde, gelatin, protein, melamine, polyurea formaldehyde, gel, polymelamine formaldehyde, wax material, emulsions, etc. For example, polymelamine and polyurea formaldehyde are both used for encapsulations by interfavial polymerization which uses two immiscible phases. Once separated in the same vessel, a reaction is initiated at the interface of the two immiscible phases in the presence of an initiator and the material to be encapsulated. As polymerization occurs, microcapsules 154 form around the core material. The microcapsules 154 release the environmental indicator material 158 upon rupturing the microcapsules 154.

Figure 10:
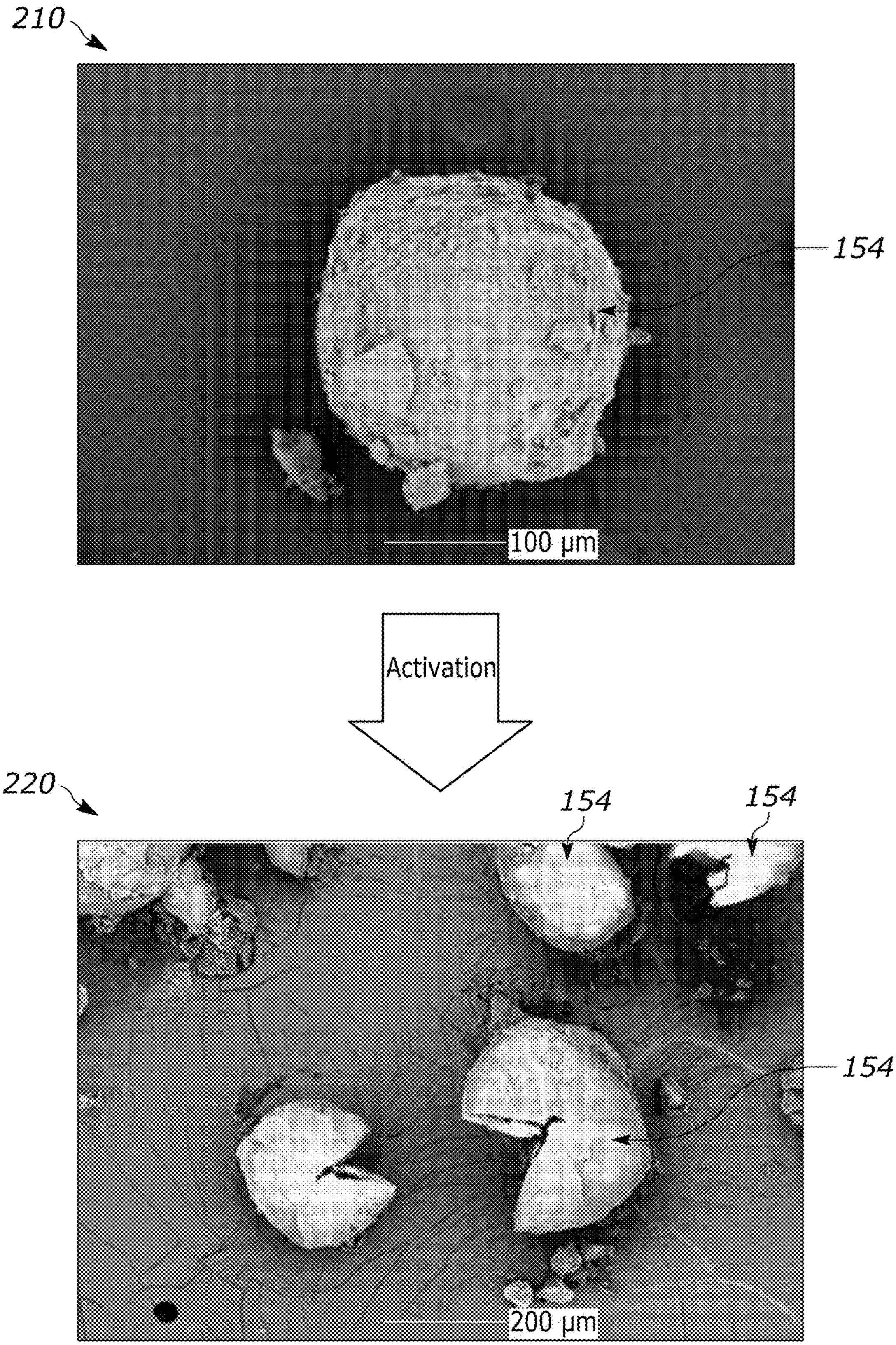
FIG. 10 illustrates a microcapsule rupturing after an activation process, according to at least one aspect of the present disclosure.

FIG. 10 illustrates a microcapsule rupturing after an activation process, according to at least one aspect of the present disclosure. The view 210 illustrates a microcapsule 154 before activation and view 220 illustrates a ruptured microcapsule after activation that released the environmental indicator material 158.

In at least one aspect, at least a portion of the microcapsules 154 are ruptured based on a force applied to the microcapsules 154, where the force exceeds or equals a predetermined threshold. The value of the predetermined threshold is based on the microcapsule material, thickness of the microcapsules 154, and/or the diameter of the microcapsules 154. The force can be a pressure force, a shear force, a frictional force, and/or a cutting force that cause at least a portion of the microcapsules 154 to rupture. In at least one aspect, the force is a pressure force and the predetermined threshold is between 1.5 pounds per square inch and 8 pounds per square inch. In an alternative aspect, the force is a pressure force and the predetermined threshold is between 4 pounds per square inch and 15 pounds per square inch.

In at least one aspect, the portion of the microcapsules 154 are ruptured based, in part, on a temperature of the microcapsules 154, where the temperature of the microcapsules 154 exceeds or is equal to a predetermined temperature threshold. For example, temperature increases can cause the microcapsules 154 to rupture based on a minor amount of force being applied to the microcapsules 154. The value of the predetermined temperature threshold is based on the microcapsule material, the thickness of microcapsules 154, and/or the diameter of the microcapsules 154. In at least one aspect, the predetermined temperature threshold is between 90° C. and 110° C. In an alternative aspect, the predetermined temperature threshold is between 90° C. and 250° C.

In at least one aspect, at least a portion of the microcapsules 154 are ruptured based on both a force applied to the microcapsules 154 and a temperature of the microcapsules 154, where the force exceeds or equals a predetermined threshold and the temperature of the microcapsules 154 exceeds or is equal to a predetermined temperature threshold. The force can be a pressure force, a shear force, a frictional force, or a cutting force that cause at least a portion of the microcapsules 154 to rupture. In at least one aspect, the predetermined temperature threshold is between 90° C. and 110° C., the force is a pressure force, and the predetermined threshold is between 4 pounds per square inch and 15 pounds per square inch. In at least one aspect, the predetermined threshold is between 1.5 pounds per square inch and 8 pounds per square inch. In an alternative aspect, the predetermined threshold is between 4 pounds per square inch and 15 pounds per square inch In at least one aspect, each microcapsule 154 of the microcapsules 154 can have a first wall and a second wall encapsulating the environmental indicator material 158. The first wall is configured to rupture based, in part, on a temperature being equal to or greater than a predetermined temperature threshold. The second wall is configured to rupture based on a force equal to or greater than a predetermined threshold being applied to the microcapsules 154. As discussed above, the force can be a pressure force, a shear force, a frictional force, or a cutting force that causes at least a portion of the microcapsules 154 to rupture. In this aspect, both heat and a force would need to be applied to the microcapsules 154 for at least a portion of the microcapsules 154 to rupture.

The microcapsules 154 are configured to rupture in response to heat and/or force, and contain environmental indicator materials 158, e.g., the microcapsules 154 described in the commonly owned applications: U.S. Patent Application titled "PRINTER ACTIVATABLE ENVIRONMENTAL SENSING THROUGH CHEMICAL ENCAPSULATION", Ser. No. 18/369,498; and U.S. Patent Application, titled "USE OF ENCAPSULATED POLAR PROTIC CHEMISTRIES FOR RFID TEMPERATURE MONITORING", Ser. No. 18/369,506, both filed concurrently with this application.

Figure 11:
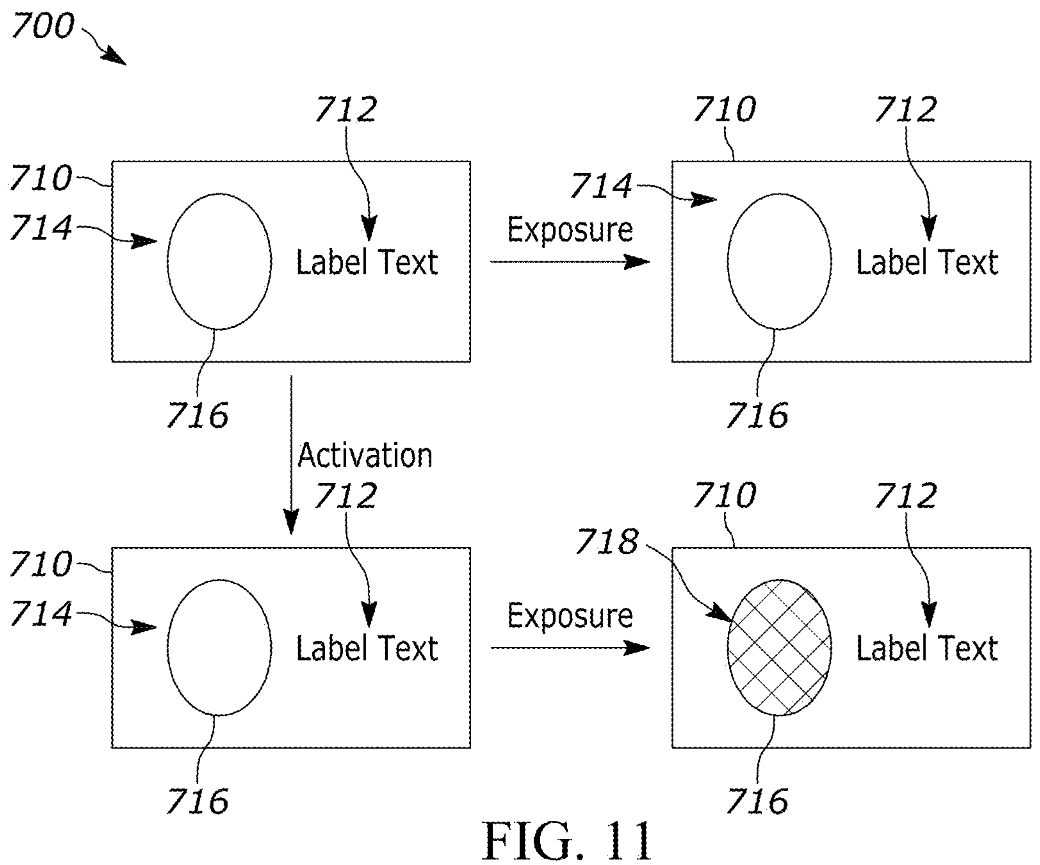
FIG. 11 illustrates a diagram showing a media element exposed to the predetermined environmental condition before and after activation, according to at least one aspect of the present disclosure.

FIG. 11 illustrates a diagram 700 showing a media element 710 exposed to the predetermined environmental condition before and after activation, according to at least one aspect of the present disclosure. The media element 710 is substantially similar to media element 100. For the sake of brevity not all similarities will be discussed in detail. The media element 710 includes label text 712 and an environmental sensor 716. The environmental sensor 716 is substantially similar to environmental sensor 150 and for the sake of brevity not all similarities will be discussed in detail. The environmental sensor 716 begins in a non-activated configuration, where the environmental sensor 716 is in an initial sensor state 714 before activation and exposure. After an activation process, the environmental sensor 716 is placed in the activated configuration, where the environmental indicator material 158 in the environmental sensor 716 has been released from at least a portion of the microcapsules 154. When the released environmental indicator material 158 is exposed to the predetermined environmental condition, then the environmental sensor 716 transitions from the initial sensor state 714 to a second sensor state 718. In at least one aspect, before activation, the environmental sensor 716 does not change sensor states even when exposed to the predetermined environmental condition.

The environmental indicator material 158 encapsulated in the microcapsules 154 can be different based on the desired environmental sensor 150 or 716. The environmental indicator material 158 can be a polymer, a polymer having side-chain crystallinity, an alkane wax, a polar protic material, a wax with a colorant, a gel with a colorant, an acid, a base, etc., or a combination thereof. Some example polar protic materials are polyethylene glycol, decanol, undecanol, dodecanol, and tridecanol. The type of environmental indicator material 158 used relates to the type of environmental sensor 150 or 716. Which allows the environmental indicator material 158 to be responsive to the appropriate predetermined environmental condition for the type of environmental sensor 150 or 716 desired. Some example predetermined environmental conditions are as follows: a temperature excursion above a predetermined temperature threshold for at least a predetermined amount of time, a temperature excursion below a predetermined temperature for at least a predetermined amount of time, a cumulative exposure to temperature over a time period above a predetermined threshold for at least a predetermined amount of time, an exposure to a particular chemical, an oxygen exposure, an ammonia exposure, an exposure to a particular chemical above a threshold concentration, an exposure to a particular chemical above the threshold concentration for at least a predetermined amount of time, an exposure to at least a predetermined amount of radiation of a particular type, an ultraviolet light exposure, a humidity exposure, an exposure to a humidity level above a predetermined threshold, an exposure to a humidity level above a predetermined threshold for at least a predetermined amount of time, and etc.

Once the environmental indicator material 158 is released from at least a portion of the microcapsules 154 (i.e., after an activation process ruptures the microcapsules 154) and exposed to the predetermined environmental condition, then the released environmental indicator material 158 changes from an initial material state (e.g. corresponding to the initial sensor state 714) to a second material state (e.g. corresponding to the second sensor state 718) producing an observable effect. The observable effect can be one of a color state change, a change in transparency, a change in hue, a change in an electrical property, a change in conductivity, a change in capacitance, movement of the environmental indicator material 158 along a substrate, etc., or combinations thereof. In at least one aspect, the observable effect can be a continuous transition; however, once a threshold is met, the environmental sensor 150 or 716 would be considered to go from the initial sensor state to the second sensor state.

The observable effect is different based on the environmental indicator material 158 and the design of the media element 100 or 710. For example, an observable effect of movement of the environmental indicator material 158 along a substrate of the media element 100 or 710 can be caused by the substrate including a wick that allows a liquid environmental indicator material 158 to move along the wick (e.g., the environmental indicator material 158 can be liquid in the second material state). As another example, a change in an electrical property can be caused by an environmental indicator material 158 that melts above a specific temperature, which then allows the material to change an electrical property of a device, for example altering a dielectric in a capacitor changing capacitance, or, with a conductive liquid, completing or breaking a circuit built into the substrate of the media element 100 or 710, which changes the electrical property.

Figure 12:
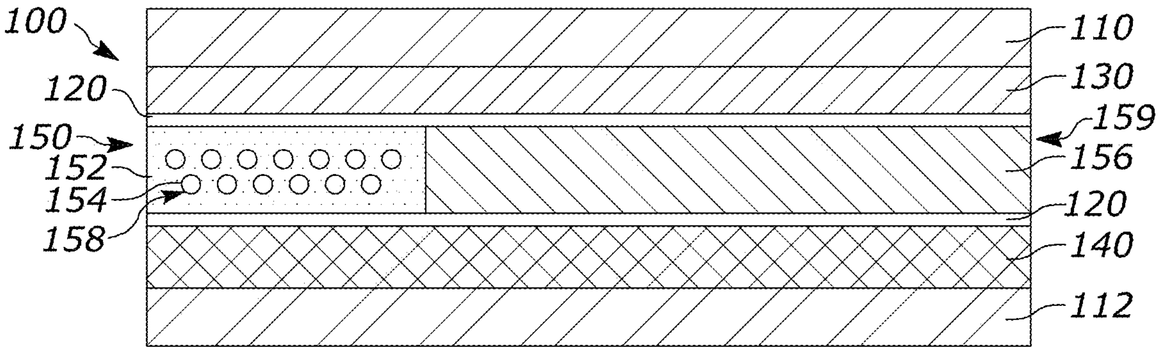
FIG. 12 illustrates a diagram of an example media element passing between two media processing components, according to at least one aspect of the present disclosure.

FIG. 12 illustrates a diagram of the example media element 100 passing between two media processing components 110, 112, according to at least one aspect of the present disclosure. In at least one aspect, the media processing components 110, 112 cause at least a portion of the microcapsules 154 to rupture as the media element 100 is passed between the media processing components 110, 112. For example, the media processing components 110, 112 can be used to supply the force and/or temperature needed to cause at least a portion of the microcapsules 154 to rupture. Stated another way, the media processing components 110, 112 can supply a pressure to the media element 100 above the predetermined threshold, which in turn causes at least a portion of the microcapsules 154 to rupture releasing the environmental indicator material 158. For example, the media processing components 110, 112 can supply a pressure of 13 pounds per square inch with the predetermined threshold being 8 pounds per square inch, which would cause at least a portion of the microcapsules 154 to rupture.

The releasing of the environmental indicator material 158 transitions the environmental sensor 150 on the media element 100 from a non-activated configuration to an activated configuration. Once in the activated configuration, the environmental sensor 150 can change from an initial sensor state to a second sensor state upon exposure of the environmental indicator material 158 to the predetermined environmental condition. In some aspects, the media processing components 110, 112 can be part of the print head assembly of a media processing device, e.g. print head assembly 450 of media processing device 300. In some alternative aspects, the media processing components 110, 112 can be part of an activation mechanism located upstream or downstream of the print head assembly in a media processing device.

In at least one aspect, the media processing components 110, 112 can be the print head 460 and the platen roller 480. For example, as a media element 100 with an environmental sensor 150 passes between the platen roller 480 and print head 460, the media processing device 300 applies a force on the media element 100 through the platen roller 480 and the print head 460. The force applied by the platen roller 480 and the print head 460 to the media element 100 is greater than or equal to the predetermined threshold such that at least a portion of the microcapsules 154 in the environmental sensor 150 are ruptured. In at least one aspect, the force is a pressure. For example, the predetermined threshold can be 5 pounds per square inch and the platen roller 480 and the print head 460 can supply a force of 8 pounds per square inch to the media element 100 causing a portion of the microcapsules 154 to rupture.

In at least one aspect, the media element 100 can be printed with a thermal transfer printing process and the force applied by the platen roller 480 and the print head 460 to the media element 100 during the thermal transfer printing process can rupture at least a portion of the microcapsules 154 in the environmental sensor 150 on the media element 100. As such, the environmental sensor 150 on the media element 100 can transition from the non-activated configuration to the activated configuration during the thermal transfer printing process.

In at least one aspect, the media element 100 includes a heat activated thermal coating. In this aspect, the media element 100 can be printed with a direct thermal printing process and the force applied by the platen roller 480 and the print head 460 to the media element 100 during the direct thermal printing process can rupture at least a portion of the microcapsules 154 in the environmental sensor 150 on the media element 100. As such, the environmental sensor 150 on the media element 100 can transition from the non-activated configuration to the activated configuration during the direct thermal printing process.

In at least one aspect, at least a portion of the microcapsules 154 are ruptured based on both a force applied to the microcapsules 154 and a temperature of the microcapsules 154, where the force exceeds or equals a predetermined threshold and the temperature of the microcapsules 154 exceeds or is equal to a predetermined temperature threshold. In this aspect, the print head 460 is configured to apply the heat required to raise the temperature of the microcapsules 154 above the predetermined temperature threshold and the print head 460 and platen roller 480 can apply a force to the microcapsules 154 as a media element 100 passed between the print head 460 and platen roller 480.

The force required to be applied by the media processing components 110, 112 on the media element 100 to rupture the microcapsules 154 can be reduced if one or more of the media processing components are textured (e.g., rough or abrasive). In at least one aspect, an abrasiveness causes the microcapsules 154 to rupture at a lower force from the media processing components 110, 112. For example, the predetermined threshold can be 15 pounds per square inch without an abrasive component and the predetermined threshold can be 8 pounds per square inch with an abrasive component. As such, more microcapsules 154 can be ruptured at the same force with a textured media processing component 110, 112, than with non-textured media processing components 110, 112. Thus, a textured component can increase the amount of microcapsules 154 that are ruptured as the media element 100 passes through the media processing device 300.

Figure 13:
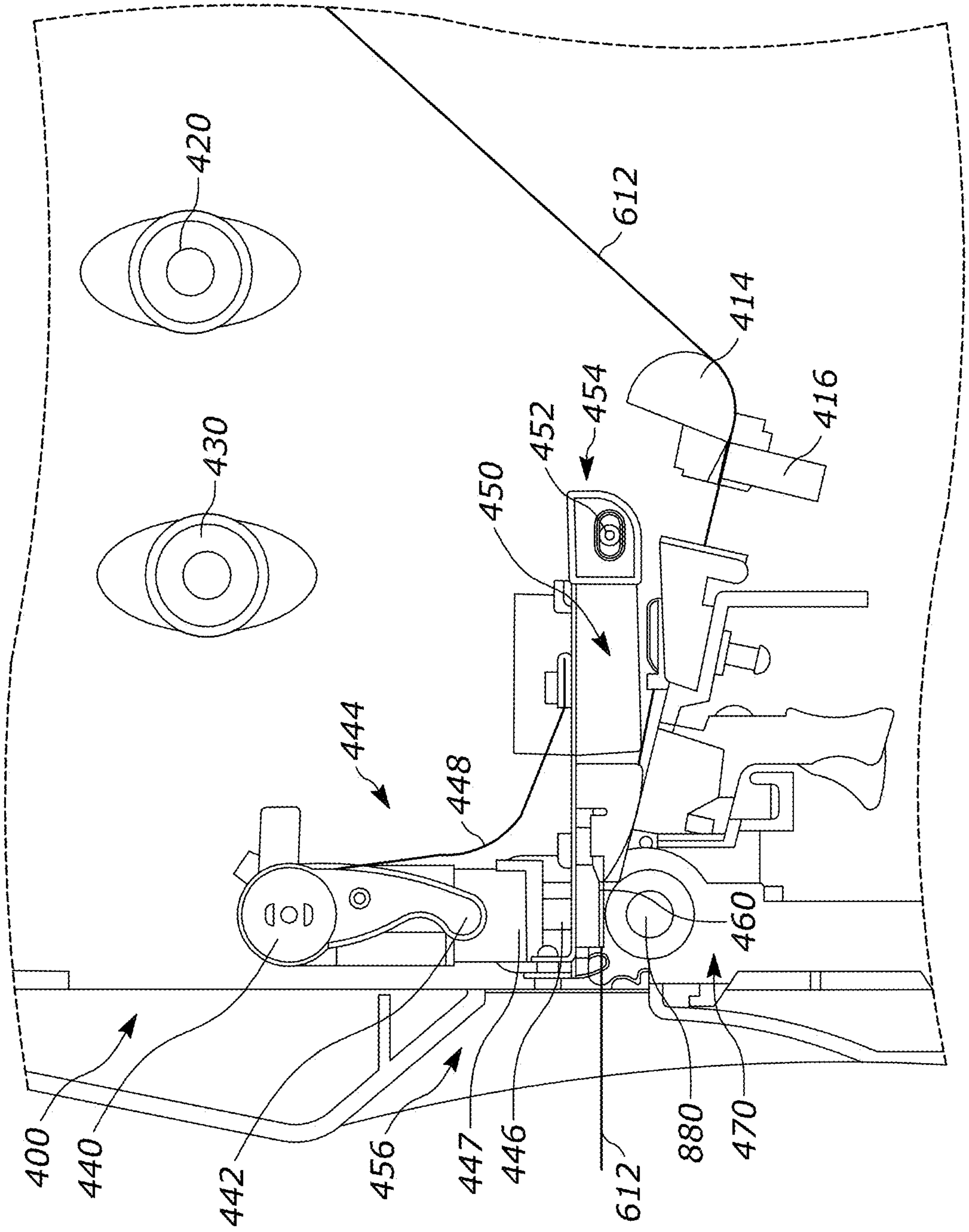
FIG. 13 illustrates a textured platen roller installed in the printing mechanism of the media processing device of FIG. 1, according to at least one aspect of the present disclosure.

FIG. 13 illustrates an textured platen roller 880 installed in place of the platen roller 480 of the printing mechanism 400 of the media processing device 300, according to at least one aspect of the present disclosure. The textured platen roller 880 can have rough or abrasive surface. As a media element 100 with an environmental sensor 150 passes between the platen roller 880 and print head 460, the media processing device 300 applies a force on the media element 100 through the platen roller 880 and print head 460. In at least one aspect, the force is a pressure. For example, the platen roller 880 and the print head 460 can be configured to supply a pressure anywhere between 1 and 15 pounds per square inch to the media element 100. The platen roller 880 can be created by having a platen roller with a textured surface, which can be a rough or abrasive surface, a knurled surface, a harder surface (e.g., harder than a convention platen roller), or etc., or combinations thereof. There are different of ways to make the surface more abrasive and some of these are discussed below in more detail.

Figure 14A:
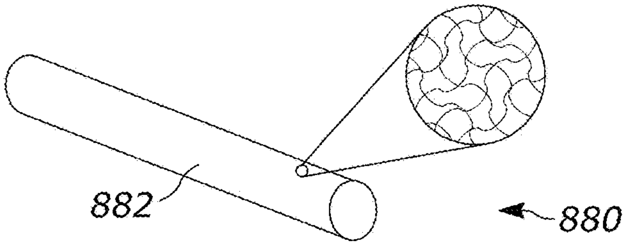
FIG. 14A illustrates an example abrasive platen roller with a rough textured outer surface, according to at least one aspect of the present disclosure.

In at least one aspect, the platen roller 880 has a textured surface, e.g. a rough, or abrasive surface. FIG. 14A illustrates an example textured platen roller 882 with a rough or abrasive outer surface according to at least one aspect of the present disclosure. In at least one aspect, the rough outer surface is sand paper, e.g. sandpaper in the range of 60 grit to 300 grit. In an alternative aspect, the rough outer surface is formed from a texture or pattern cut into the outer surface, such as a knurled surface. In yet another alternative aspect, the rough outer surface is formed from small hard particles being attached to the outer surface of the platen roller 882. In at least one aspect, the particles are harder than the microcapsules. For example, a coated abrasive using aluminum oxide, silicon carbide, ceramic materials, flap discs, glass powder, and/or various other natural and synthetic abrasives can be applied to the rough outer surface. The textured platen roller 882 is an example of the platen roller 880.

A pressure is applied by the platen roller 882 and the print head 460 on the media element 100 as the media element 100 passes between the textured platen roller 882 and the print head 460. The textured surface causes an increase in at least one of friction force, shear force, and pressure force on the media element 100 with the environmental sensor 150 including the microcapsules 154. For example, the textured surface creates an uneven surface that is pressed against the microcapsules 154 causing a higher friction force, shear force, and/or pressure force on the individual microcapsules 154 allowing them to rupture at a lower force from the media processing device. As such, the predetermined threshold can be lowered due to the textured platen roller 882.

Figure 14B:
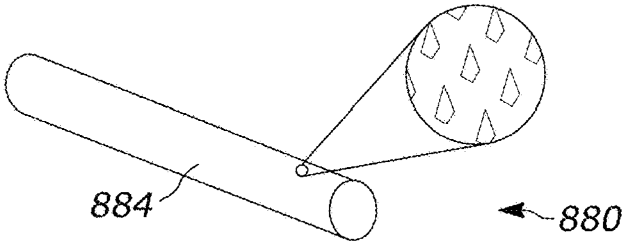
FIG. 14B illustrates another example abrasive platen roller showing microneedles distributed on the outer surface of the abrasive platen roller, according to at least one aspect of the present disclosure.

In an alternative aspect, the textured surface of the platen roller 880 includes a surface with microneedles. FIG. 14B illustrates a textured platen roller 884 showing microneedles on the outer surface of the platen roller 884, according to at least one aspect of the present disclosure. The microneedles can have a length of 150-1500 micrometers, a width of 50-250 micrometers wide, and a max diameter of 1-25 micrometers. The microneedles are typically made of silicon, stainless steel, sugar, or polymers. The microneedles can be solid, coated, hollow, or dissolvable. The platen roller 884 is an example of the platen roller 880. A pressure is applied by the platen roller 884 and the print head 460 on the media element 100 as the media element 100 passes between the platen roller 884 and the print head 460. The points of the microneedles cause an increase in at least one of cutting force, shear force, and pressure on the individual microcapsules 154 on the media element 100.

In an alternative/additional aspect, the platen roller 880 is harder than the platen roller 480. For example, the abrasive platen roller can be made of stainless steel, treated rubber, treated silicone, polyurethane, graphite, and various other compounded material to increase the hardness compared to the platen roller 480. In at least one aspect, the hardness at the platen roller 880 is greater than or equal to a 2 on the Mohs hardness scale. In at least one aspect, the hardness is between 1 and 10 on the Mohs hardness scale. The platen roller 880 being harder allows the pressure from the abrasive platen roller 880 and print head 460 to transfer more directly to the media element 100 and the microcapsules 154. The increased hardness can allow the print head 460 and platen roller 880 to apply a higher pressure to the individual microcapsules 154 on the media element 100 as the media element 100 passes between the print head 460 and the platen roller 880.

Figure 15A:
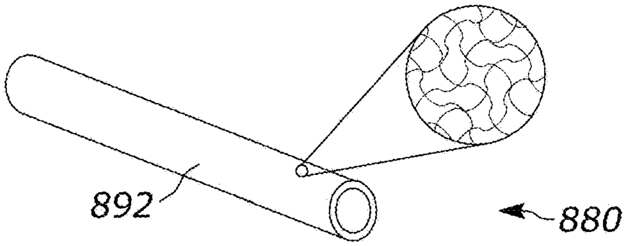
FIG. 15A illustrates an example abrasive jacket with a rough textured outer surface, according to at least one aspect of the present disclosure.
Figure 15B:
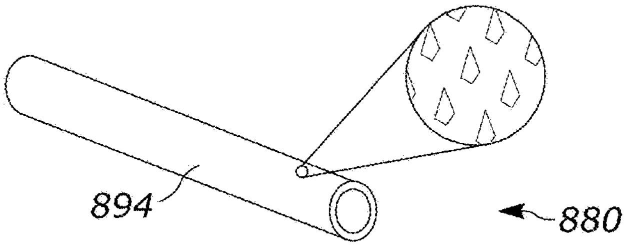
FIG. 15B illustrates an example abrasive jacket with microneedles distributed on the outer surface of the abrasive jacket, according to at least one aspect of the present disclosure.

In at least one aspect, the platen roller 880 can be formed from a platen roller with an abrasive jacket around the exterior surface of the platen roller. FIG. 15A illustrates an example abrasive jacket 892 with a rough textured outer surface, e.g. sand paper, according to at least one aspect of the present disclosure. A platen roller, e.g. platen roller 480, can be slid into the abrasive jacket 892 forming an abrasive platen roller that would function similar to the platen roller 882. The abrasive jacket 892 can include the same materials and material size as the platen roller 882. FIG. 15B illustrates another example abrasive jacket 894 with microneedles distributed on the outer surface of the abrasive jacket 894, according to at least one aspect of the present disclosure. A platen roller, e.g. platen roller 480, can be slide into the abrasive jacket 894 forming an abrasive platen roller that would be similar to abrasive platen roller 884. The abrasive jacket 894 can include the same materials and material size as the abrasive platen roller 884.

Referring back to FIG. 13, the media processing device 300 with the platen roller 880 can be used to transition an environmental sensor 150 on a media element 100 from a non-activated configuration to an activated configuration. The media processing device 300 can also be used to perform a printing process on the media element 100 while it is transitioning the environmental sensor 150 from the non-activated configuration to the activated configuration. For example, FIG. 13 illustrates the media processing device 300 configured for a direct thermal printing process. In at least one aspect, the media elements 100 on the media web 612 have a heat activated thermal coating. As such, a media element 100 of the media web 612 can be printed with a direct thermal printing process and the force applied by the abrasive platen roller 880 and the print head 460 to the media element 100 during the direct thermal printing process can rupture at least a portion of the microcapsules 154 in the environmental sensor 150 on the media element 100. The rupturing of at least the portion of the microcapsules 154 can place the environmental sensor 150 in the activated configuration.

Figure 16:
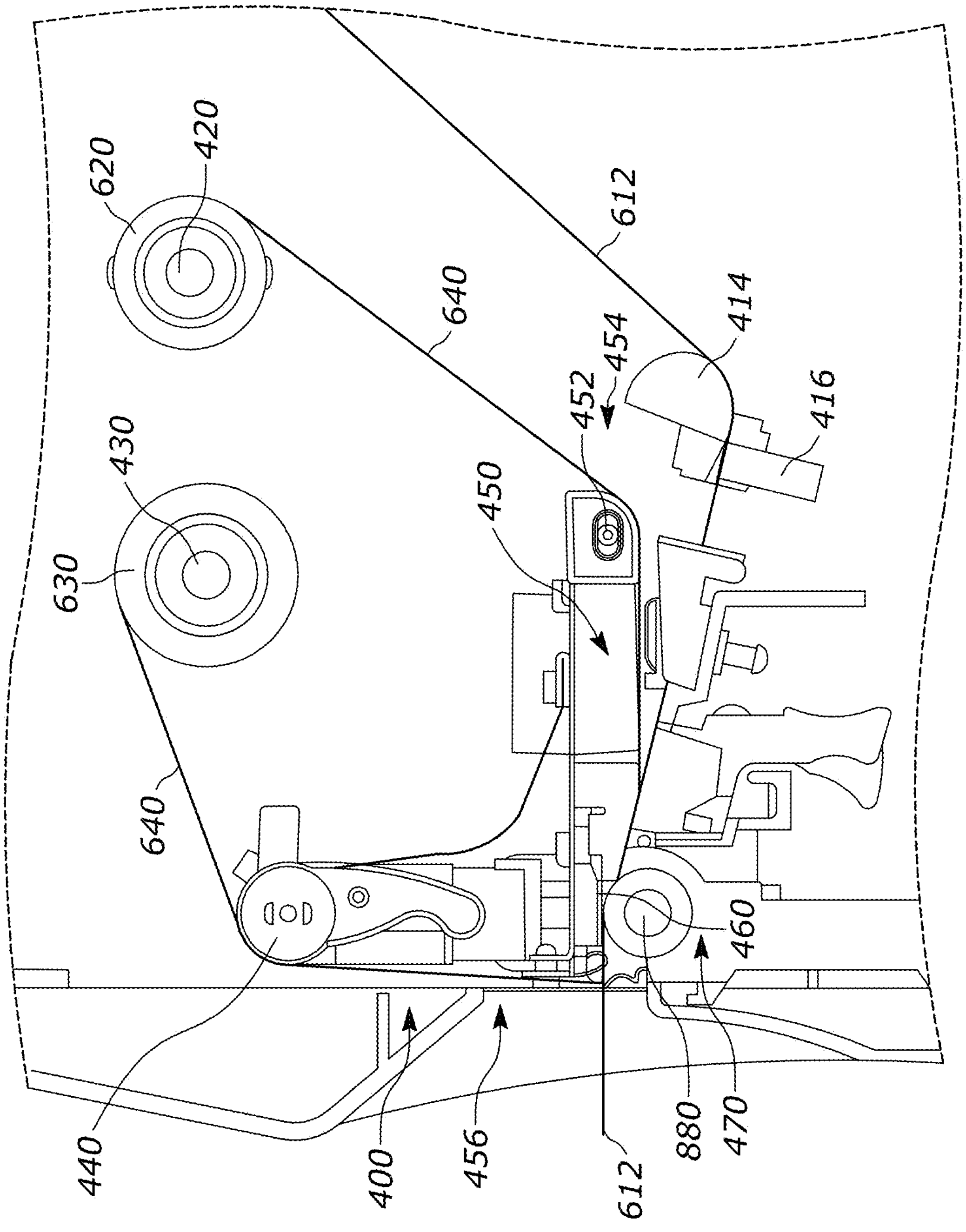
FIG. 16 illustrates a thermal transfer ribbon installed into the printing mechanism of the media processing device of FIG. 13, according to at least one aspect of the present disclosure.

In at least one aspect, the media processing device 300 performs a thermal transfer printing process on the media element 100 while it is transitioning the environmental sensor 150 on the media element 100 from the non-activated configuration to the activated configuration. FIG. 16 illustrates an ink ribbon 640 installed into the printing mechanism 400 of the media processing device of FIG. 13, according to at least one aspect of the present disclosure. The media element 100 can be printed with the thermal transfer printing process and the force applied by the platen roller 880 and the print head 460 to the media element 100 during the thermal transfer printing process can rupture at least a portion of the microcapsules 154 in the environmental sensor 150 on the media element 100. The rupturing of at least the portion of the microcapsules 154 can place the environmental sensor 150 in the activated configuration.

Figure 17:
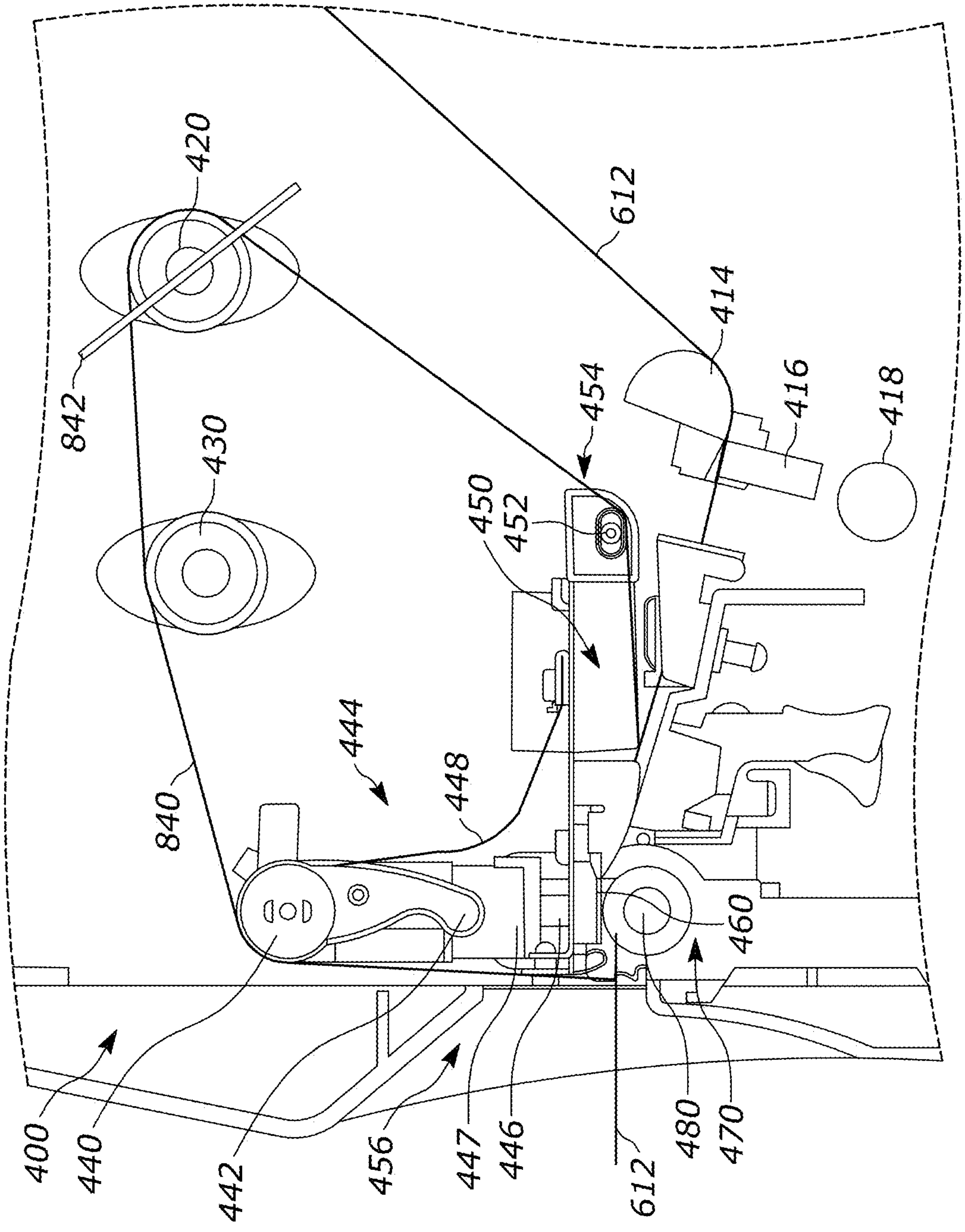
FIG. 17 illustrates a looped abrasive ribbon installed along the ink ribbon path of the printing mechanism of the media processing device, according to at least one aspect of the present disclosure.

FIG. 17 illustrates a looped abrasive ribbon 840 installed along the ink ribbon path of the printing mechanism 400 of the media processing device 300, according to at least one aspect of the present disclosure. The looped abrasive ribbon 840 follows a similar path to the ink ribbon; however, the looped abrasive ribbon 840 completes a loop by extending between the ribbon supply spindle 420 and ribbon take-up spindle 430. In this way, the looped abrasive ribbon 840 can loop around the print head assembly 450 and pass between the print head 460 and the platen roller 480. In at least one aspect, rotation of the ribbon supply spindle 420, ribbon take-up spindle 430, and platen roller 480 move the looped abrasive ribbon 840 past the print head 460 and around the loop. In an alternative aspect, rotation of only the platen roller 480 moves the looped abrasive ribbon 840 past the print head 460 and around the loop. In yet another alternative aspect, rotation of the ribbon supply spindle 420 and the ribbon take-up spindle 430 moves the looped abrasive ribbon 840 past the print head 460 and around the loop.

The looped abrasive ribbon 840 is in alignment with the media web 612 loaded into the printing mechanism 400. In at least one aspect, an alignment bar 842 can be used to keep the looped abrasive ribbon 840 from moving laterally and out of alignment with the media web 612. For example, the alignment bar 842 can keep the looped abrasive ribbon 840 on the ribbon supply spindle 420 and ribbon take-up spindle 430 as the looped abrasive ribbon 840 moves past the print head 460. In at least one aspect, the ribbon supply spindle 420 has an alignment bar similar to alignment bar 842.

When installed, the looped abrasive ribbon 840 has an abrasive looped outer surface placed between the print head 460 and platen roller 480. In at least one aspect, the abrasive outer surface is a rough, or textured, surface. In at least one aspect, the abrasive outer surface is sand paper, e.g. sandpaper in the range of 60 grit to 300 grit. In an alternative aspect, the abrasive outer surface is formed from a texture or pattern cut into the outer surface. In yet another alternative aspect, the abrasive outer surface is formed from a plurality of small hard particles being attached to the looped outer surface. In at least one aspect, the particles are harder than the microcapsules. For example, a coated abrasive using aluminum oxide, silicon carbide, ceramic materials, flap discs, glass powder, and/or various other natural and synthetic abrasives can be applied to the abrasive outer surface. In an additional or alternative aspect, the abrasive outer surface includes a plurality of microneedles. The microneedles can have a length of 150-1500 micrometers, a width of 50-250 micrometers wide, and a max diameter of 1-25 micrometers. The microneedles are typically made of silicon, stainless steel, sugar, or polymers. The microneedles can be solid, coated, hollow, or dissolvable. The microneedles can be attached to a substrate in a looped configuration to form the looped abrasive ribbon 840.

As shown in FIG. 17, the media web 612 is positioned between the looped abrasive ribbon 840 and the platen roller 480, such that the print head 460 rest against the looped abrasive ribbon 840, the looped abrasive ribbon 840 rest against the media web 612, and the media web 612 rest against the platen roller 480. A pressure is applied by the platen roller 480 and the print head 460 on a media element 100 as the media web 612 passes between the platen roller 480 and the print head 460. The pressure causes the looped abrasive ribbon 840 to be pressed against the media element 100 on the media web 612. For example, the platen roller 480 and the print head 460 can be configured to supply a pressure anywhere between 1 and 15 pounds per square inch to the media element 100 and looped abrasive ribbon 840. Similar to the platen roller 880, the abrasive surface can create an uneven surface that is pressed against the microcapsules 154 causing an increase in at least one of friction force, shear force, and/or pressure on the individual microcapsules 154 on the media element 100 allowing them to rupture at a lower force from the media processing device. In at least one aspect, the abrasive surface includes microneedles, and the points of the microneedles causes an increase in cutting force and pressure on the individual microcapsules 154 on the media element 100.

FIG. 17 illustrates the looped abrasive ribbon 840 as a loop that can continuously move past the print head 460. In an alternative aspect, the abrasive ribbon can function similar to an ink ribbon, where the abrasive ribbon includes an abrasive supply spool and an abrasive take-up spool, each disposed on a respective spindle 420, 430. In this aspect, the abrasive ribbon is fed along the ink ribbon path extending from the supply spool to the take-up spool. The abrasive ribbon would function similar to looped abrasive ribbon 840 and can include similar abrasive materials as the looped abrasive ribbon 840 for improving the rupture of microcapsules 154 on the media element 100. The main difference being that the abrasive ribbon would not loop continuously and the abrasive supply spool and the abrasive take-up spool would need replaced when the abrasive supply spool is empty. In at least one aspect, the abrasive ribbon can be reused by reloading the abrasive supply spool from the abrasive take-up spool. In an alternative aspect, the abrasive ribbon can be reused by using the full abrasive take-up spool as the abrasive supply spool and vice versa. For example, the full abrasive take-up spool can be placed on the ribbon supply spindle 420 and the empty abrasive supply spool can be placed on the ribbon take-up spindle 430. In at least one aspect, rotation of the ribbon supply spindle 420 and ribbon take-up spindle 430 moves the abrasive ribbon past the print head 460. The direction of the movement depends on the rotation direction of the ribbon supply spindle 420 and the ribbon take-up spindle 430.

Referring to FIG. 17, the media processing device 300 with the looped abrasive ribbon 840 can be used to solely transition an environmental sensor 150 on a media element 100 from the non-activated configuration to the activated configuration. The media processing device 300 can also be used to perform a printing process on the media element 100 while it is transitioning the environmental sensor 150 from the non-activated configuration to the activated configuration. In at least one aspect, the media elements 100 on the media web 612 have a heat activated thermal coating and as such the media element 100 can be printed with a direct thermal printing process. The force applied by the platen roller 480, looped abrasive ribbon 840, and the print head 460 to the media element 100 during the direct thermal printing process can rupture at least a portion of the microcapsules 154 in the environmental sensor 150 on the media element 100. The rupturing of at least the portion of the microcapsules 154 can place the environmental sensor 150 in the activated configuration.

Figure 18:
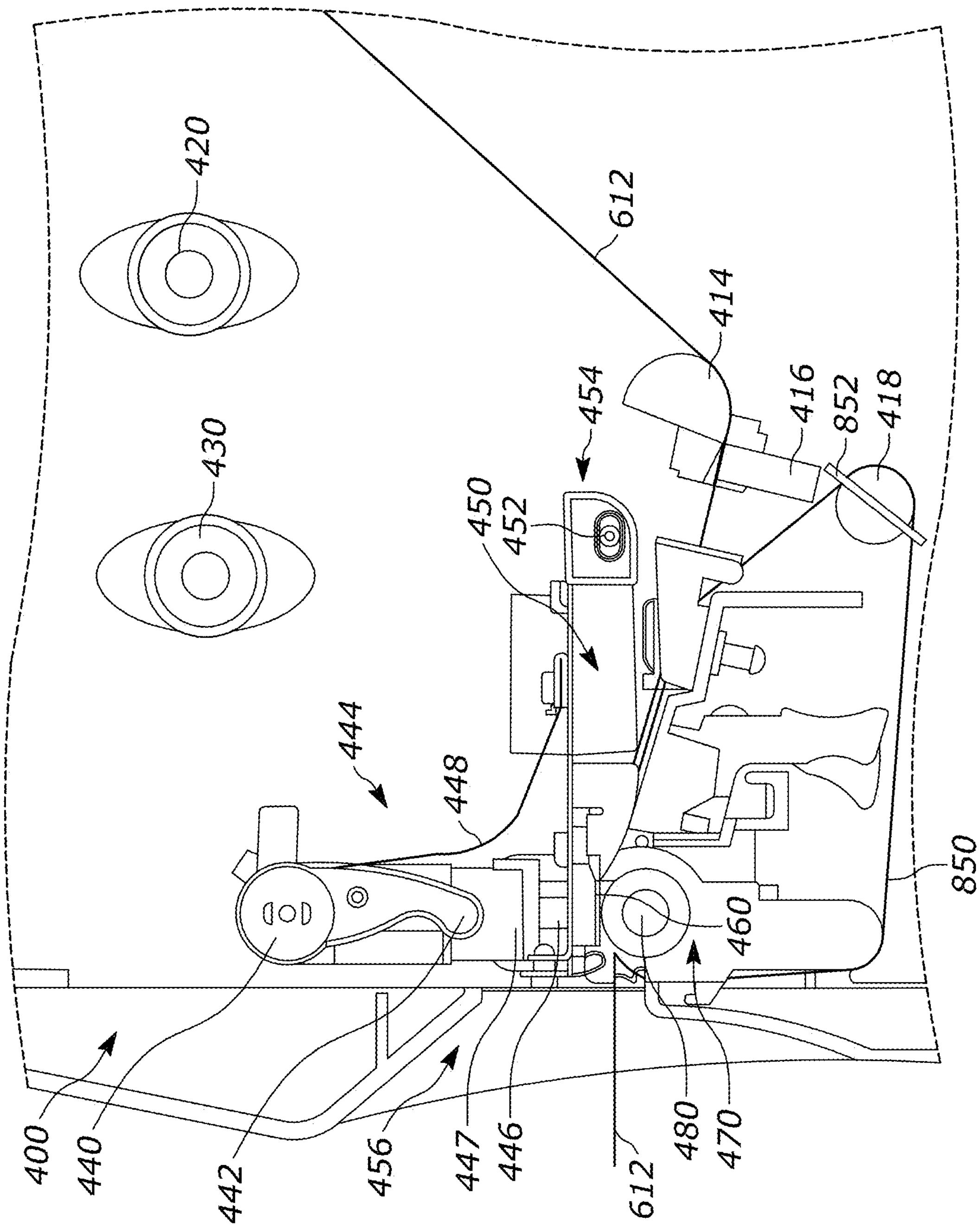
FIG. 18 illustrates a looped abrasive ribbon installed along a lower loop of the printing mechanism, according to at least one aspect of the present disclosure.

FIG. 18 illustrates a looped abrasive ribbon 850 installed along a lower loop of the printing mechanism 400, according to at least one aspect of the present disclosure. The looped abrasive ribbon 850 is similar to and functions similar to the looped abrasive ribbon 840. For the sake of brevity, not all similarities will be discussed in detail. The looped abrasive ribbon 850 can be made of the same materials and in the same manner as looped abrasive ribbon 840. The lower loop extends from the media take-up roller 418 and into the upstream end 454 of the print head assembly 450 and past the print head 460 and platen roller 480. The lower loop makes a downward transition after the platen roller 480 and extends around the platen assembly 470 and back to the media take-up roller 418 to complete the loop. In at least one aspect, the rotation of both the media take-up roller 418 and platen roller 480 move the looped abrasive ribbon 850 past the print head 460 and around the loop. In an alternative aspect, rotation of only the platen roller 480 moves the looped abrasive ribbon 850 past the print head 460 and around the loop. In yet another alternative aspect, rotation of only the media take-up roller 418 moves the looped abrasive ribbon 840 past the print head 460 and around the loop.

The looped abrasive ribbon 850 is in alignment with the media web 612 loaded into the printing mechanism 400. In at least one aspect, an alignment bar 852 can be used to keep the looped abrasive ribbon 850 from moving laterally and out of alignment with the media web 612. The alignment bar 852 functions similar to the alignment bar 842. For example, the alignment bar 852 can keep the looped abrasive ribbon 850 on the media take-up roller 418 as the looped abrasive ribbon 850 moves past the print head 460.

When installed, the looped abrasive ribbon 850 has an abrasive surface placed between the print head 460 and platen roller 480. In at least one aspect, the abrasive surface is a rough, or textured, surface. In an additional or alternative aspect, the abrasive surface includes microneedles. As shown in FIG. 18, the media web 612 is positioned between the looped abrasive ribbon 840 and the print head 460, such that the print head 460 rest against the media web 612, the media web 612 rest against the looped abrasive ribbon 840, the abrasive ribbon rest against the platen roller 480. A pressure is applied by the platen roller 480 and the print head 460 on a media element 100 as the media web passes between the platen roller 480 and the print head 460. The pressure force causes the looped abrasive ribbon 850 to be pressed against the media element 100 on the media web 612. For example, the platen roller 480 and the print head 460 can be configured to supply a pressure anywhere between 1 and 15 pounds per square inch to the media element 100 and looped abrasive ribbon 850. Similar to the abrasive platen roller 880 and looped abrasive ribbon 840, the abrasive surface can create an uneven surface that is pressed against the microcapsules 154 causing an increase in at least one of friction force, shear force, and/or pressure force on the individual microcapsules 154 on the media element 100 allowing them to rupture at a lower force from the media processing device. In at least one aspect, the abrasive surface includes microneedles, and the points of the microneedles causes an increase in at least one of cutting force, shear force, and pressure force on the individual microcapsules 154 on the media element 100.

Figure 19:
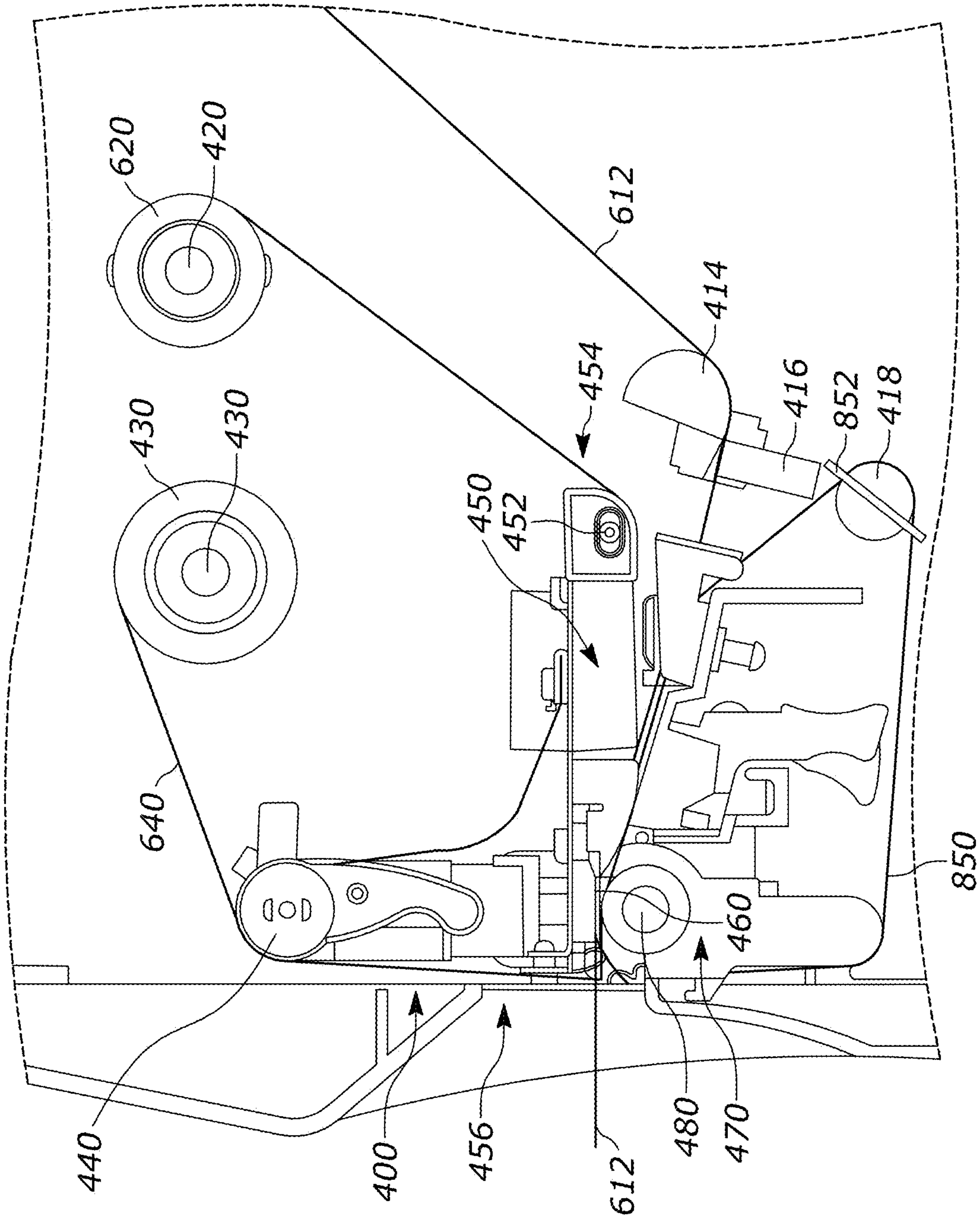
FIG. 19 illustrates an ink ribbon installed along the ink ribbon path of the printing mechanism and a looped abrasive ribbon being installed along the lower loop of the printing mechanism, according to at least one aspect of the present disclosure.

The media processing device 300 with the looped abrasive ribbon 850 can be used to solely transition an environmental sensor 150 on a media element 100 from the non-activated configuration to the activated configuration. The media processing device 300 can also be used to perform a printing process on the media element 100 while it is transitioning the environmental sensor 150 from the non-activated configuration to the activated configuration. In at least one aspect, the media elements 100 on the media web 612 have a heat activated thermal coating and as such the media element 100 can be printed with a direct thermal printing process. In an alternative aspect, an ink ribbon 640 can be installed into the printing mechanism 400 and as such the media element 100 can be printed on with a thermal transfer printing process. FIG. 19 illustrates an ink ribbon 640 installed along the ink ribbon path of the printing mechanism 400 and a looped abrasive ribbon 850 being installed along the lower loop of the printing mechanism 400, according to at least one aspect of the present disclosure. The force applied by the platen roller 480, abrasive ribbon 850, and the print head 460 to the media element 100 during the direct thermal printing process, or thermal transfer printing process, can rupture at least a portion of the microcapsules 154 in the environmental sensor 150 on the media element 100. The rupturing of at least the portion of the microcapsules 154 can place the environmental sensor 150 in the activated configuration.

FIGS. 13-19 illustrate examples of activation mechanisms that are part of the printing mechanism 400 of the media processing device 300. The platen roller 880, the looped abrasive ribbon 840, the looped abrasive ribbon 850, and abrasive ribbon are all examples of activation mechanisms that are part of the printing mechanism 400. The media processing device 300 can be placed into a printing mode that performs a printing process on a media element 100, while not transitioning an environmental sensor 150 to the activated configuration during the printing process. The media processing device 300 can also be placed into an activation mode that turns the printing mechanism 400 into an activation mechanism that places the environmental sensor 150 in the activated configuration as the media element 100 is passed through the printing mechanism 400. In at least one aspect, in the activated configuration the platen roller 880, the looped abrasive ribbon 840, the looped abrasive ribbon 850, or the abrasive ribbon is installed. In at least one aspect, in the printing mode, the platen roller 880, the looped abrasive ribbon 840, the looped abrasive ribbon 850, or the abrasive ribbon are not installed.

In at least one aspect, the media processing device 300 can be placed into a printing mode by not installing an activation mechanism, e.g. the abrasive platen roller 880, the looped abrasive ribbon 840, the looped abrasive ribbon 850, or the abrasive ribbon. In an alternative aspect, the media processing device 300 can be placed into the printing mode by decreasing the temperature and/or force supplied by the printing mechanism 400 such that the temperature and/or force does not exceed a threshold to place the environmental sensor 150 in the activated configuration. In the printing mode, the media processing device 300 can perform a printing process on a media element 100 with an environmental sensor 150 and the printing process would not transition the environmental sensor 150 from the non-activated configuration. For example, a media element 100 can be fed into an upstream end 454 of the print head assembly 450 and past the print head 460 and platen roller 480. The print head 460 and platen roller 480 can then be used to perform a printing process, e.g. a direct thermal process or a thermal transfer printing process as discussed in regard to FIGS. 5 and 7. The printing process in the print mode, would not transition the environmental sensor 150 from the non-activated configuration. For example, the temperature and/or force would not exceed the threshold to place the environmental sensor 150 in the activated configuration.

In at least one aspect, the media processing device 300 can be placed into an activation mode by installing an activation mechanism into the print head assembly 450, e.g. the abrasive platen roller 880, the looped abrasive ribbon 840, the looped abrasive ribbon 850, or the abrasive ribbon. In an alternative aspect, the media processing device 300 is placed into the activation mode by increasing the temperature and/or force supplied by the print head assembly 450 to exceed the threshold to place the environmental sensor 150 in the activated configuration. For example, the print head 460 and the platen roller 480 can be the activation mechanism by supplying enough force and/or temperature to the media element 100 to place the media element 100 in the activated configuration. Once the media processing device 300 is in the activation mode, the media element 100 is fed through the upstream end 454 of the print head assembly 450, through the print head assembly 450, and out the downstream end 456 of the print head assembly 450. As the media element 100 is fed through the print head assembly 450, the print head assembly supplies enough force and/or temperature to rupture at least a portion of the microcapsules 154 in the environmental sensor 150 on the media element 100. The rupturing of at least the portion of the microcapsules 154 places the environmental sensor 150 in the activated configuration.

In at least one aspect, printing the media element 100 in print mode occurs prior to activating the media element 100 in activation mode. For example, the media element 100 can be printed and then stored for a period of time until a user desires to activate the environmental sensor 150 on the media element 100. This can allow a user to print media elements 100 with environmental sensors 150 and then at a later date place a portion of the media elements 100 in the activated configuration, while keeping a portion of the media elements 100 in the non-activated configuration.

In an alternative aspect, activating the media element 100 in activation mode occurs prior to printing the media element 100 in print mode. For example, the media processing device 300 can have an activation mechanism installed and the media processing device 300 can be used to place all the environmental sensors 150 in the activated configuration. In at least one aspect, the user stores the media elements 100 in the activated configuration until a later date to print the media elements 100. In an alternative aspect, the user prints the media elements 100 directly after placing the media elements 100 in the activated configuration.

One method of activating an activatable media element, e.g. media element 100, includes feeding the activatable media element into an upstream end of a printing mechanism, e.g. printing mechanism 400. The method further includes placing the printing assembly in the print mode. In at least one aspect, the printing assembly is placed in the printing mode by reducing the force and/or temperature supplied by the print head and platen to be below the predetermined threshold for rupturing microcapsules 154. For example, the temperature and/or force can be reduced by electronically controlling, e.g. by way of a control circuit, the force and/or temperature supplied by the print head and platen. Another example of reducing the force would be to remove an activation mechanism from the printing mechanism if one is already installed. In at least one aspect, the method further includes printing the media element using the printing mechanism in the print mode. The method further includes ejecting the media element out of a downstream end of the printing assembly.

In at least one aspect, the method further includes storing the printed media element in the non-activated configuration. In this aspect, there is a delay between printing the media element and placing the environmental sensor 150 in the activated configuration. Additionally in this aspect, the method further includes feeding the media element into the upstream end of a printing mechanism when a user is ready to place the media element into the activated configuration. In an alternative aspect, the method further includes retracting the media element backward through the printing mechanism after the printing.

The method further includes placing the printing assembly in the activation mode. In at least one aspect, the printing assembly is placed in the active mode by increasing the force and/or temperature supplied by the print head and platen to be equal to or exceed the predetermined threshold for rupturing microcapsules 154. For example, the temperature and/or force can be increased by electronically controlling, e.g. by way of a control circuit, the force and/or temperature supplied by the print head and platen. Another example of increasing the force would be to install an activation mechanism, e.g. the platen roller 880, the looped abrasive ribbon 840, the looped abrasive ribbon 850, or the abrasive ribbon, into the printing mechanism.

The method further includes placing the environmental sensor 150 in the activated configuration by feeding the media element through the printing mechanism with the printing mechanism in the activation mode. As the media element is fed through the printing mechanism, the printing mechanism supplies enough force and/or temperature to rupture at least a portion of the microcapsules 154 in the environmental sensor 150 on the media element. For example, the force is greater than the predetermined threshold required to rupture microcapsules 154. The rupturing of at least the portion of the microcapsules 154 places the environmental sensor 150 in the activated configuration. The method further includes ejecting the activated media element out of the downstream end of the printing mechanism.

The method can be easily adjusted to have placing the environmental sensor 150 in the activated configuration first and then printing the media element second.

FIGS. 20-24 illustrate different versions of media processing devices that include an activation mechanism that is separate from the printing mechanism, e.g. printing assembly 400. Each activation mechanism has a top portion and a bottom portion. A media element 100 is passed between the top portion and bottom portion to allow the activation mechanism to transition the media element 100 from the non-activated configuration to the activated configuration. For example, the activation mechanism can supply a heat and/or force to the media element 100 such that at least a portion of the microcapsules 154 of the environmental sensor 150 are ruptured.

The method of activating an activatable media element described above is described in relation to a media processing device where the printing mechanism is adjusted to be the activation mechanism. It is noted that the method can be adjusted to have the activation mechanism be separate from the printing mechanism. For example, the printing mechanism would remain in printing mode and the activation process can be performed with a separate activation device. In at least one aspect, the separate activation device is part of the media processing device. In an alternative aspect, the separate activation device is outside of the media processing device. As discussed in regard to the method above, the activation process can be performed before or after the printing process.

Figure 20:
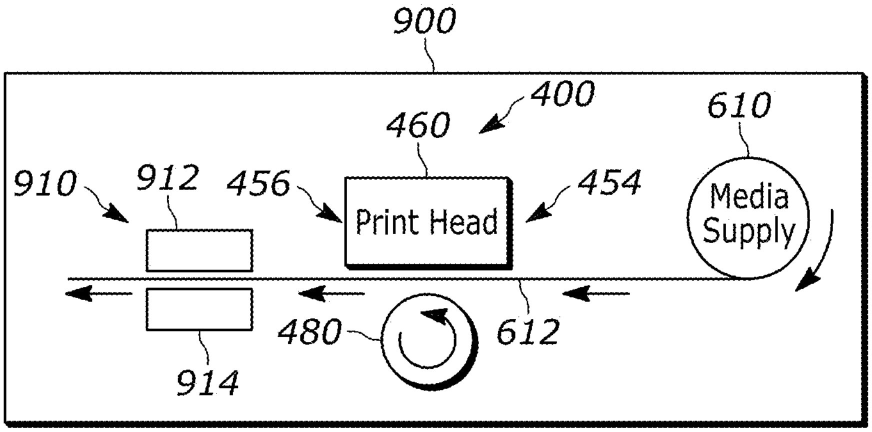
FIG. 20 shows a diagram which illustrates the operation of a media processing device that includes an activation mechanism positioned downstream of the printing assembly, according to at least one aspect of the present disclosure.

FIG. 20 shows a diagram which illustrates the operation of a media processing device 900 that includes an activation mechanism 910 positioned downstream of the printing assembly 400, according to at least one aspect of the present disclosure. Media processing device 900 functions similar to media processing device 300 and for the sake of brevity not all similarities will be discussed in detail. The main different between media processing device 900 and media processing device 300 is that the activation mechanism 910 is not part of the printing mechanism, e.g. printing assembly 400.

The media processing device 900 includes the media supply roll 610 that is made of the media web 612 that has media elements 100 that have environmental sensors 150 including environmental indicator material 158 encapsulated in microcapsules 154. Similar to media processing device 300, the media supply roll 610 can be replaced with a media input or a different media supply as discussed in regard to FIG. 3. The media web 612 enters the printing assembly 400 at the upstream end 454 and passes by the print head 460 and platen roller 480 to exit out the downstream end 456 of the printing assembly 400. As a media element 100 on the media web passes through the printing assembly 400, the printing assembly 400 performs a printing process on the media element 100. In at least one aspect, the printing process is a direct thermal printing process where the media element 100 has a heat activated thermal coating. In an alternative aspect, the printing process is a thermal transfer printing process where the printing assembly 400 has an ink ribbon installed.

The media element 100 exits the printing assembly 400 with the environmental sensor 150 in the non-activated configuration. For example, a predetermined temperature threshold can be 150° C. and a predetermined pressure force threshold can be 11 pounds per square inch. The printing process can be performed at 110° C. with a pressure force of 6 pounds per square inch, which is below the thresholds resulting in no to minimal rupturing of the microcapsules 154 in the environmental sensor 150. In at least one aspect, the microcapsules 154 rupture based on a force and the temperature does not substantially affect the force required to rupture the microcapsules 154.

After the media element 100 exits the printing assembly 400, the media element 100 enters the activation mechanism 910 and passes between the top portion 912 and bottom portion 914 of the activation mechanism 910. The activation mechanism supplies a heat and/or force to the media element 100 such that at least a portion of the microcapsules 154 of the environmental sensor 150 are ruptured. In at least one aspect, the activation mechanism increases the temperature of the microcapsules 154 on the media element 100 such that the temperature of the microcapsules 154 exceeds or is equal to the predetermined temperature threshold. For example, the predetermined temperature threshold can be 150° C. and the activation mechanism can heat the media element 100 up to 200° C. exceeding the temperature threshold. In an additional or alternative aspect, the activation mechanism applies a force to the microcapsules 154 such that the force exceeds or equals a predetermined threshold. The force can be a pressure force, a shear force, a frictional force, and/or a cutting force that cause at least a portion of the microcapsules 154 to rupture. For example, the predetermined pressure force threshold can be 11 pounds per square inch and the activation mechanism can supply a pressure force of 15 pounds per square inch exceeding the threshold. The rupturing of at least the portion of the microcapsules 154 places the environmental sensor 150 on the media element 100 in the activated configuration.

Figure 21:
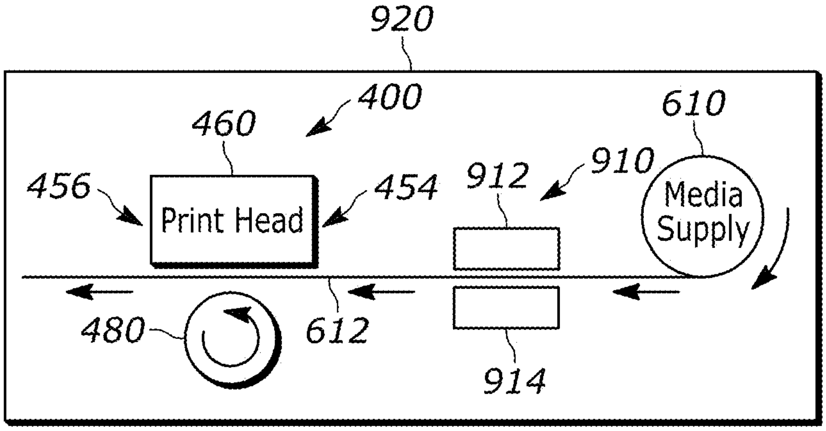
FIG. 21 shows a diagram which illustrates the operation of an alternative media processing device that includes the activation mechanism of FIG. 20 positioned upstream of the printing mechanism, according to at least one aspect of the present disclosure.

FIG. 20 illustrates the activation process occurring after the printing process; however, the activation process can occur prior to the printing process. FIG. 21 shows a diagram which illustrates the operation of a media processing device 920 that includes the activation mechanism 910 positioned upstream of the printing mechanism 400, according to at least one aspect of the present disclosure. The media processing device 920 is substantially similar to media processing device 900, for the sake of brevity the similarities will not be discussed in detail. The main difference being that the activation mechanism 910 performs the activation process on the media element 100 before the printing mechanism 400 performs a printing process.

The activation mechanism 910 can be devices that can supply a force and/or heat to a media element 100 passing through the activation mechanism. In at least one aspect, the activation mechanism 910 is a pair of textured rollers, where each textured roller is similar to the platen roller 880. For example, the top portion 912 can be a first textured roller and the bottom portion 914 can be a second textured roller. The first textured roller and the second textured roller apply a force to the media element 100 as the media element 100 is fed between the first textured roller and the second textured roller. Each textured roller has a textured surface. The textured surface can include a rough surface, an abrasive surface, a knurled surface, microneedles, a hard surface, and/or combinations thereof. The media element 100 is compressed between the textured surfaces of the textured rollers and the textured surfaces cause a friction force, a shear force, a cutting force, or a pressure force, or combinations thereof on the individual microcapsules 154 on the media element 100. The force applied to the microcapsules 154 is equal to or greater than the predetermined threshold causing at least a portion of the microcapsules 154 to rupture. The rupturing of at least the portion of the microcapsules 154 places the environmental sensor 150 on the media element 100 in the activated configuration.

Figure 22:
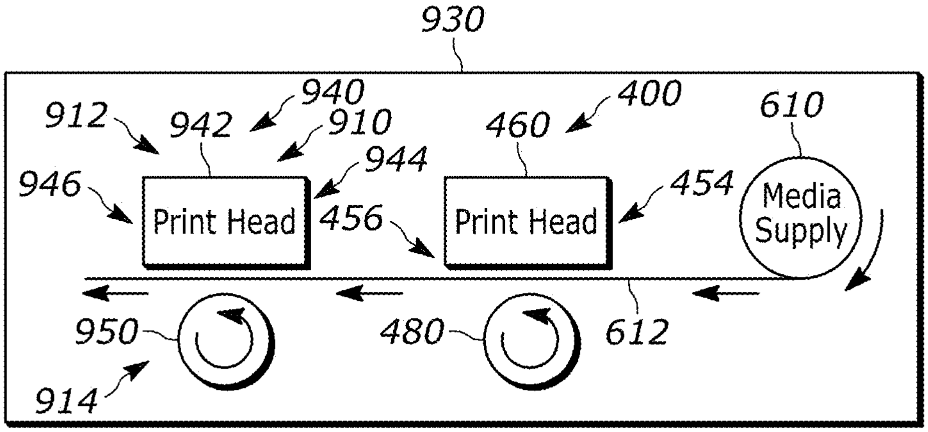
FIG. 22 shows a diagram which illustrates the operation of another alternative media processing device that has dual print heads, where the activation mechanism is part of a second printing mechanism, according to at least one aspect of the present disclosure.
Figure 23:
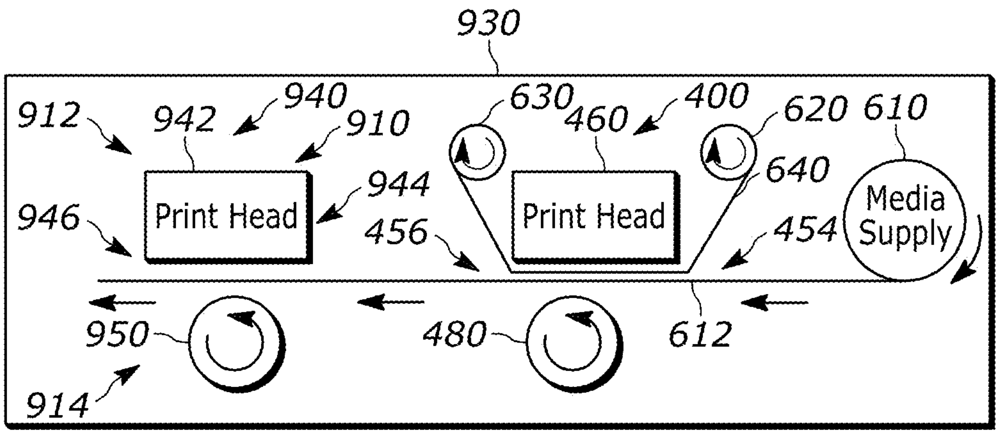
FIG. 23 shows a diagram which illustrates the operation of yet another alternative media processing device that has dual print heads, where the printing mechanism has an ink ribbon installed, according to at least one aspect of the present disclosure.
Figure 24:
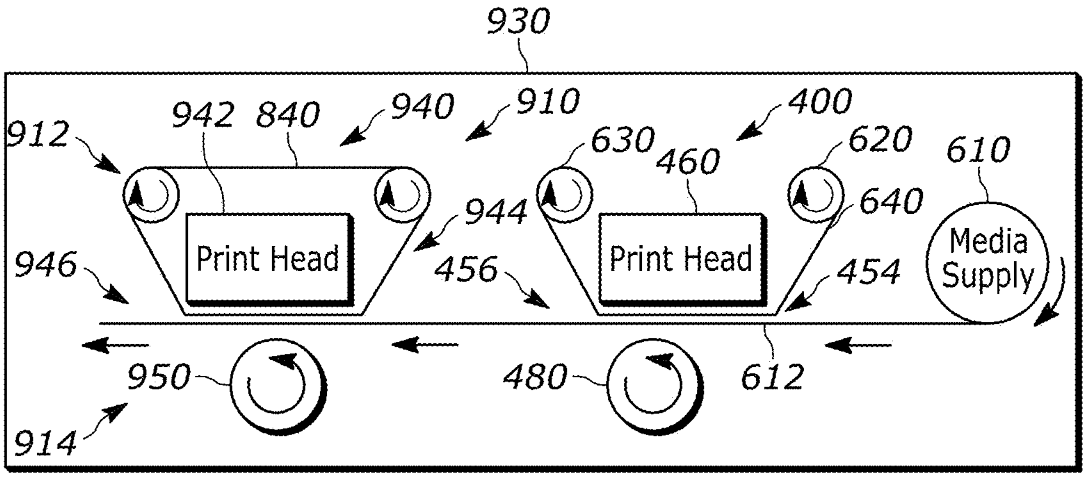
FIG. 24 shows a diagram which illustrates the operation of yet another alternative media processing device that has dual print heads, where the printing mechanism has an ink ribbon installed and the second printing mechanism has a looped abrasive ribbon installed, according to at least one aspect of the present disclosure.

The activation mechanism 910 being a pair of textured rollers is one example of an activation mechanism. FIGS. 22-24 illustrate example media processing devices with dual print heads where the activation mechanism is part of the second printing mechanism. These second printing mechanisms are configured to transition an environmental sensor 150 from the non-activated configuration to the activated configuration.

FIG. 22 shows a diagram which illustrates the operation of an alternative media processing device 930 that has dual print heads 460 and 942, where the activation mechanism 910 is part of a second printing mechanism 940, according to at least one aspect of the present disclosure. The media processing device 900 is substantially similar to media processing device 930, where the activation mechanism 910 is the second printing mechanism 940. The second printing mechanism 940 includes a print head 942 and a platen roller 950. The second printing mechanism 940 is the activation mechanism 910, where the print head 942 is the top portion 912 and the platen roller 950 is the bottom portion 914. The second printing mechanism 940 is configured to supply enough heat and/or force to the media element 100 to rupture at least a portion of the microcapsules 154 of the environmental sensor 150 as discussed throughout the present disclosure. For example, the print head 942 can heat up to 300° C., and the print head 942 and platen roller 950 can supply a pressure of up to 15 pound per square inch to a media element 100 passed between.

FIG. 22 illustrates the printing mechanism 400 configured for direct thermal printing of the media element 100. However, by installing an ink ribbon, the printing mechanism 940 can be configured for thermal transfer printing of the media element 100. FIG. 23 shows a diagram which illustrates the operation of media processing device 930 that has dual print heads, where the printing mechanism 400 has an ink ribbon 640 installed, according to at least one aspect of the present disclosure. The media web 612 extends from the media supply roll 610 and into the upstream end 454 of the printing mechanism 400. A media element 100 of the media web 612 is moved through the printing mechanism 400, where the print head 460 and platen roller 480 perform a printing process, e.g. direct thermal (FIG. 22) or thermal transfer (FIG. 23), on the media element 100. The media element 100 exits the printing mechanism 400 at the downstream end 456 and the media element 100 then enters the printing mechanism 940 at an upstream end 944. The media element 100 exits the printing assembly 400 with the environmental sensor 150 in the non-activated configuration. For example, a predetermined temperature threshold can be 150° C. and a predetermined pressure force threshold can be 11 pounds per square inch. The printing process can be performed at 110° C. with a pressure force of 6 pounds per square inch, which is below the thresholds resulting in no to minimal rupturing of the microcapsules 154 in the environmental sensor 150.

The printing mechanism 940 is configured to supply a force, and in some aspects heat, to the media element 100 to transition the media element 100 from the non-activated configuration to the activated configuration as discussed in regard to FIGS. 11-19. For example, the print head 942 can supply a heat to the media element 100 to heat the media element 100 up to 200° C. which would exceed a predetermined temperature threshold of 150° C. The print head 942 and platen roller 950 can be configured to apply a pressure (e.g. a pressure between 1 to 15 pounds per square inch) to the media element 100 as the media element 100 passes between the print head 942 and platen roller 950. In some aspects, the pressure supplied by the print head 942 and platen roller 950 causes a force greater than the predetermined threshold on the individual microcapsules 154 as they pass through the printing mechanism 940. The force is one or more of a pressure force, a shear force, a cutting force, or a frictional force. For example, the force can be a pressure force of 15 pounds per square inch which exceeds a predetermined pressure force threshold of 11 pounds per square inch. The rupturing of at least the portion of the microcapsules 154 places the environmental sensor 150 on the media element 100 in the activated configuration as the media element 100 exits the second printing mechanism 400 at the downstream end 946.

In some aspects, a textured member, e.g. the platen roller 880, the looped abrasive ribbon 840, the looped abrasive ribbon 850, or the abrasive ribbon, can be installed into the printing mechanism 940 to increase the amount of microcapsules 154 ruptured as the media element 100 passes through the printing mechanism 940. This increase is due to the textured member increasing the pressure force, shear force, cutting force, or frictional force on the individual microcapsules 154 as they pass through the printing mechanism 940, as discussed in more detail in regard to FIGS. 13-19. There are different ways to configure the printing mechanism 940 and printing mechanism 400 to print and activate a media element 100. For the sake of brevity, not all of these combinations of abrasive members with the printing mechanism 940 will be discussed in detail.

One example configuration is to install an ink ribbon on the printing mechanism 400 and a looped abrasive ribbon 840 on the printing mechanism 940. FIG. 24 shows a diagram which illustrates the operation media processing device 930 that has dual print heads, where the printing mechanism 400 has an ink ribbon 640 installed and the second printing mechanism 940 has a looped abrasive ribbon 840 installed, according to at least one aspect of the present disclosure. In this example configuration, the printing process is a thermal transfer printing process performed by the printing mechanism 400. The activation process is performed by the printing mechanism 940 and the process is similar to the process of rupturing a portion of the microcapsules 154 discussed in regard to FIG. 17. In at least one aspect, the media element 100 that exits the media processing device 930 has been printed and has an environmental sensor 150 that has been placed in the activated configuration.

As shown in FIG. 21, the activation mechanism 910 can be placed upstream of the printing mechanism 400. As such, the reader will appreciate that the activation mechanism 910 in FIGS. 22-24, e.g. printing mechanism 940, can be placed upstream of the printing mechanism 400.

In the foregoing detailed description, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the terms "component," "system," "module" and the like can refer to a computer-related entity, either hardware, a combination of hardware and software, software, or software in execution.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions can be implemented by a state machine that has no stored program instructions, or in one or more application specific integrated circuits (ASICs), in which each function or some combinations of certain of the functions are implemented as custom logic. Of course, a combination of the two approaches can be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processing device, comprising:

a printing assembly configured to process a media element as the media element passes through the printing assembly, the media element comprises an environmental sensor having an activated configuration in which the environmental sensor is configured to change from an initial sensor state to a second sensor state in response to exposure to a predetermined environmental condition and a non-activated configuration in which the environmental sensor is configured to remain in the initial sensor state in response to exposure to the predetermined environmental condition; and an activation mechanism configured to apply a force equal to or greater than a predetermined threshold to at least a portion of the environmental sensor to transition the environmental sensor from the non-activated configuration to the activated configuration, the activation mechanism comprising at least one of (a) a roller having an abrasive jacket, (b) a roller having an abrasive coated on an outer surface of the roller, (c) a roller having microneedles on the outer surface of the roller, (d) a roller having a texture or pattern cut into the outer surface of the roller, (e) a ribbon having an abrasive applied thereto, (f) a ribbon having an texture or pattern cut in an outer surface of the ribbon, or (g) a ribbon having microneedles on the outer surface of the ribbon.

2. The media processing device of claim 1, wherein the environmental sensor comprises a plurality of microcapsules containing an environmental indicator material responsive to the predetermined environmental condition, and wherein at least a portion of the plurality of microcapsules are ruptured by the activation mechanism to place the environmental sensor in the activated configuration.

3. The media processing device of claim 1, wherein the force comprises at least one of a pressure force, a shear force, a frictional force, or a cutting force.

4. The media processing device of claim 1, wherein the activation mechanism comprises the roller of (a), (b), (c) or (d), wherein the printing assembly comprises the roller and a print head, and wherein the environmental sensor is placed in the activated configuration due to the force placed on the media element while the media element is passed between the print head and the roller.

5. The media processing device of claim 1, wherein the activation mechanism comprises the ribbon of (e), (f), or (g), wherein the printing assembly comprises a print head, a roller, and the ribbon, wherein the ribbon is configured to pass between the print head and the roller, and wherein the environmental sensor is placed in the activated configuration due to the force placed on the media element by the ribbon, print head, and roller while the media element is passed between the print head and the roller.

6. The media processing device of claim 5, wherein the media element is positioned between the ribbon and the roller.

7. The media processing device of claim 5, wherein the media element is positioned between the ribbon and the print head.

8. The media processing device of claim 7, wherein the printing assembly further comprises a thermal transfer ribbon, wherein the thermal transfer ribbon is positioned between the media element and the print head.

9. The media processing device of claim 1, wherein the activation mechanism is positioned upstream of the printing assembly to place the environmental sensor in the activated configuration prior to processing by the printing assembly.

10. The media processing device of claim 1, wherein the activation mechanism is positioned downstream of the printing assembly to place the environmental sensor in the activated configuration after processing by the printing assembly.

11. The media processing device of claim 1, wherein the activation mechanism forms part of the printing assembly to place the environmental sensor in the activated configuration while the media element is being processed by the printing assembly.

12. The media processing device of claim 1, wherein the activation mechanism comprises a pair of rollers (a), (b), (c) or (d), placed on the media element while the media element is passed between the pair of rollers.

13. The media processing device of claim 1, wherein the environmental sensor is placed in the activated configuration based on both the force greater than the predetermined threshold being applied to at least the portion of the environmental sensor and a temperature of at least the portion of the environmental sensor being equal to or greater than a predetermined temperature threshold.

14. The media processing device of claim 1, wherein the activation mechanism comprises the roller having the abrasive jacket.

15. The media processing device of claim 14, wherein the abrasive jacket has abrasive particles coated thereon.

16. The media processing device of claim 14, wherein the abrasive jacket has microneedles on an outer surface of the abrasive jacket.

17. The media processing device of claim 1, wherein the activation mechanism comprises the roller having abrasive particles coated on the outer surface of the roller.

18. The media processing device of claim 1, wherein the activation mechanism comprises the roller having microneedles on the outer surface of the roller.

19. The media processing device of claim 1, wherein the activation mechanism comprises the roller having the texture or pattern cut on the outer surface of the roller.

20. The media processing device of claim 1, wherein the activation mechanism comprises the ribbon having abrasive particles applied to the outer surface of the ribbon.

21. The media processing device of claim 1, wherein the activation mechanism comprises the ribbon having a texture or pattern cut in the outer surface of the ribbon.

22. The media processing device of claim 1, wherein the activation mechanism comprises the ribbon having microneedles on the outer surface of the ribbon.

23. A media processing device, comprising:

a print head; and an abrasive roller positioned opposite the print head, wherein the print head and abrasive roller are configured to receive a media element therebetween, the media element comprises an environmental sensor having an activated configuration in which the environmental sensor is configured to change from an initial sensor state to a second sensor state in response to exposure to a predetermined environmental condition and a non-activated configuration in which the environmental sensor is configured to remain in the initial sensor state in response to exposure to the predetermined environmental condition, and wherein the environmental sensor is transitioned to the activated configuration from the non-activated configuration by a force equal to or greater than a predetermined threshold being applied on at least a portion of the environmental sensor while the media element is passed between the print head and the abrasive roller.

24. The media processing device of claim 23, wherein the environmental sensor comprises a plurality of microcapsules containing a material responsive to the predetermined environmental condition, and wherein at least a portion of the plurality of microcapsules are ruptured to place the environmental sensor in the activated configuration.

25. The media processing device of claim 23, wherein the abrasive roller comprises a roller and an abrasive jacket surrounding the roller.

26. A media processing device, comprising:

a print head;

a roller positioned opposite the print head; and an abrasive ribbon, wherein the abrasive ribbon is configured to pass between the print head and the roller, wherein the print head and roller are configured to receive a media element therebetween, the media element comprises an environmental sensor having an activated configuration in which the environmental sensor is configured to change from an initial sensor state to a second sensor state in response to exposure to a predetermined environmental condition and a non-activated configuration in which the environmental sensor is configured to remain in the initial sensor state in response to exposure to the predetermined environmental condition, and wherein the environmental sensor is transitioned to the activated configuration from the non-activated configuration by a force equal to or greater than a predetermined threshold being applied by the abrasive ribbon, print head, and roller on at least a portion of the environmental sensor while the media element is passed between the print head and roller.

27. The media processing device of claim 26, wherein the media processing device further comprises a guide to maintain the abrasive ribbon in position during operation of the media processing device.

28. The media processing device of claim 26, wherein the media element is positioned between the abrasive ribbon and the roller.

29. The media processing device of claim 26, wherein the media element is positioned between the abrasive ribbon and the print head.

* * * * *